US012690070B2

(12) United States Patent
Yoshimura et al.

(10) Patent No.: US 12,690,070 B2
(45) Date of Patent: Jul. 21, 2026

(54) TERMINAL APPARATUS, BASE STATION APPARATUS, AND COMMUNICATION METHOD

(71) Applicant: SHARP KABUSHIKI KAISHA, Sakai City (JP)

(72) Inventors: Tomoki Yoshimura, Sakai City (JP); Toshizo Nogami, Sakai City (JP); Takahisa Fukui, Sakai City (JP); Shoichi Suzuki, Sakai City (JP); Daiichiro Nakashima, Sakai City (JP); Wataru Ouchi, Sakai City (JP); Huifa Lin, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 326 days.

(21) Appl. No.: 18/289,611

(22) PCT Filed: Mar. 22, 2022

(86) PCT No.: PCT/JP2022/012992
§ 371 (c)(1),
(2) Date: Nov. 6, 2023

(87) PCT Pub. No.: WO2022/239482
PCT Pub. Date: Nov. 17, 2022

(65) Prior Publication Data
US 2024/0260088 A1 Aug. 1, 2024

(30) Foreign Application Priority Data
May 10, 2021 (JP) ................................. 2021-079505

(51) Int. Cl.
*H04W 74/0833* (2024.01)
*H04L 1/00* (2006.01)

(52) U.S. Cl.
CPC ....... *H04W 74/0833* (2013.01); *H04L 1/0009* (2013.01)

(58) Field of Classification Search
CPC . H04W 74/0833; H04W 72/04; H04W 72/23; H04W 74/08; H04L 1/0009; Y02D 30/70
See application file for complete search history.

(56) References Cited

U.S. PATENT DOCUMENTS

| | | | | |
|---|---|---|---|---|
| 2021/0195629 A1* | 6/2021 | Chauvin | ............... | H04L 1/0009 |
| 2022/0132596 A1* | 4/2022 | Jeon | ................... | H04W 74/002 |
| 2023/0276436 A1* | 8/2023 | Pi | ........................... | H04L 1/189 |
| | | | | 370/329 |

FOREIGN PATENT DOCUMENTS

| | | |
|---|---|---|
| JP | 2021-507627 A | 2/2021 |
| WO | 2019/119399 A1 | 6/2019 |

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.

(Continued)

*Primary Examiner* — Chuong M Nguyen
(74) *Attorney, Agent, or Firm* — ScienBiziP, P.C.

(57) ABSTRACT

A first PRACH resource type is selected in a case that a value related to a received power of a downlink signal is lower than a threshold, a second PRACH resource type is selected in a case that the value related to the received power is larger than or equal to the threshold, an uplink grant included in a PDSCH is interpreted using a first rule in a case that the PRACH is transmitted in the first PRACH resource type, the uplink grant included in the PDSCH is interpreted using a second rule in a case that the PRACH is transmitted in the second PRACH resource type, and the uplink grant included (Continued)

| RAR grant field | Number of bits |
|---|---|
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access | in the PDSCH is interpreted using the second rule in a case that the threshold is not configured in an RRC layer processing circuitry.

2 Claims, 10 Drawing Sheets

(56) References Cited

OTHER PUBLICATIONS

RAN Chairman et al. "Release 17 package for RAN", 3GPP TSG RAN Meeting #86, Dec. 2019.
Wilus Inc., "Discussion on Type A PUSCH repetitions for Msg3", R1-2103702, 3GPP TSG RAN WG1 #104b-e, e-Meeting, Apr. 12-20, 2021.

* cited by examiner

Figure 2A: Number of OFDM symbols per slot, slots per frame, and slots per subframe for normal cyclic prefix

| $u$ | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| $u$ | $N^{slot}_{symb}$ | $N^{frame,u}_{slot}$ | $N^{subframe,u}_{slot}$ |
|---|---|---|---|
| 2 | 12 | 40 | 4 |

FIG. 2

REs for PSS

REs for SSS

REs for PBCH

Frequency

Time

| RAR grant field | Number of bits |
|---|---|
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

FIG. 9

| TPC Command | Value (in dB) |
|:-----------:|:-------------:|
| 0 | -6 |
| 1 | -4 |
| 2 | -2 |
| 3 | 0 |
| 4 | 2 |
| 5 | 4 |
| 6 | 6 |
| 7 | 8 |

FIG. 10

| TPC Command | Value (in dB) |
|:-----------:|:-------------:|
| 0 | -4 |
| 1 | 2 |
| 2 | 6 |
| 3 | 8 |

FIG. 11

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2021-79505 filed on May 10, 2021, the contents of which are incorporated herein by reference.

BACKGROUND ART

In the 3$^{rd}$ Generation Partnership Project (3GPP), a radio access method and a radio network for cellular mobile communications (hereinafter also referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as a User Equipment (UE). LTE is a cellular communication system in which multiple areas covered by base station apparatuses are arranged in a form of cells. A single base station apparatus may manage multiple serving cells.

The 3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is to be satisfy requirements for three scenarios including enhanced Mobile BroadBand (eMBB), massive Machine Type Communication (mMTC), and Ultra Reliable and Low Latency Communication (URLLC) in a single technology framework.

Study on enhancement of functions of cellular mobile communication, such as NR, is expected. For example, as described in NPL 2, study related to enhancement of functions of NR is under way.

CITATION LIST

Non Patent Literature

NPL 1: "New SID proposal: Study on New Radio Access Technology", RP-160671, NTT docomo, 3GPP TSG RAN Meeting #71, Goteborg, Sweden, 710 March 2016.
NPL 2: "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

SUMMARY OF INVENTION

Technical Problem

An aspect of the present invention provides a terminal apparatus that efficiently performs communication, a communication method used in the terminal apparatus, a base station apparatus that efficiently performs communication, and a communication method used for the base station apparatus.

Solution to Problem (1) A first aspect of the present invention is a terminal apparatus including an RRC layer processing circuitry configured to manage a first PRACH resource type in a certain BWP, a second PRACH resource type in the certain BWP, and a threshold, a MAC layer processing circuitry configured to select one PRACH resource type from the first PRACH resource type and the second PRACH resource type, a transmitter configured to transmit the PRACH in the one PRACH resource type, and a receiver configured to receive a PDCCH with an RA-RNTI calculated based on the one resource and receive a PDSCH scheduled by a DCI format included in the PDCCH, wherein the first PRACH resource type is selected in a case that a value related to a received power of a downlink signal is lower than the threshold, the second PRACH resource type is selected in a case that the value related to the received power is larger than or equal to the threshold, an uplink grant included in the PDSCH is interpreted using a first rule in a case that the PRACH is transmitted in the first PRACH resource type, the uplink grant included in the PDSCH is interpreted using a second rule in a case that the PRACH is transmitted in the second PRACH resource type, and the uplink grant included in the PDSCH is interpreted using the second rule in a case that the threshold is not configured in the RRC layer processing circuitry.

(2) A second aspect of the present invention is a base station apparatus including an RRC layer processing circuitry configured to manage a first PRACH resource type in a certain BWP, a second PRACH resource type in the certain BWP, and a threshold, a receiver configured to receive the PRACH in one PRACH resource type selected by a terminal apparatus, and a transmitter configured to transmit a PDCCH with an RA-RNTI calculated based on the one PRACH resource type and transmit a PDSCH scheduled by a DCI format included in the PDCCH, wherein an uplink grant included in the PDSCH is interpreted using a first rule in a case that the PRACH is transmitted in the first PRACH resource type, the uplink grant included in the PDSCH is interpreted using a second rule in a case that the PRACH is transmitted in the second PRACH resource type, the uplink grant included in the PDSCH is interpreted using the second rule in a case that the threshold is not configured in the RRC layer processing circuitry, and whether the uplink grant is interpreted using the first rule or the second rule is indicated to the terminal apparatus in a non-contention-based random access.

(3) A third aspect of the present invention is a communication method used in a terminal apparatus, the communication method including managing a first PRACH resource type in a certain BWP, a second PRACH resource type in the certain BWP, and a threshold, selecting one PRACH resource type of the first PRACH resource type and the second PRACH resource type, transmitting the PRACH in the one PRACH resource type, and receiving a PDCCH with an RA-RNTI calculated based on the one resource and receiving a PDSCH scheduled by a DCI format included in the PDCCH, wherein the first PRACH resource type is selected in a case that a value related to a received power of a downlink signal is lower than the threshold, the second PRACH resource type is selected in a case that the value related to the received power is larger than or equal to the threshold, an uplink grant included in the PDSCH is interpreted using a first rule in a case that the PRACH is transmitted in the first PRACH resource type, the uplink grant included in the PDSCH is interpreted using a second rule in a case that the PRACH is transmitted in the second PRACH resource type, and the uplink grant included in the PDSCH is interpreted using the second rule in a case that the threshold is not configured in the RRC layer processing circuitry.

(4) A fourth aspect of the present invention is a communication method used for a base station apparatus, the communication method including managing a first PRACH resource type in a certain BWP, a second PRACH resource type in the certain BWP, and a threshold, receiving the PRACH in one PRACH resource type selected by a terminal apparatus, and transmitting a PDCCH with an RA-RNTI calculated based on the one PRACH resource type and transmitting a PDSCH scheduled by a DCI format included in the PDCCH, wherein an uplink grant included in the PDSCH is interpreted using a first rule in a case that the PRACH is transmitted in the first PRACH resource type, the uplink grant included in the PDSCH is interpreted using a second rule in a case that the PRACH is transmitted in the second PRACH resource type, the uplink grant included in the PDSCH is interpreted using the second rule in a case that the threshold is not configured in the RRC layer processing circuitry, and whether the uplink grant is interpreted using the first rule or the second rule is indicated to the terminal apparatus in a non-contention-based random access.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between the subcarrier spacing configuration $\mu$, the number of OFDM symbols per slot $N^{slot}_{symb}$, and a cyclic Prefix (CP) configuration according to an aspect of the present embodiment.

FIG. 9 is a diagram illustrating an example of a first rule used for interpreting a bit sequence included in a random access response grant according to an aspect of the present embodiment.

FIG. 10 is a diagram illustrating a configuration example of a transmission power value in a TPC command field for PUSCH according to an aspect of the present embodiment.

FIG. 11 is a diagram illustrating a configuration example of a transmission power value in a TPC command field for PUSCH in a second rule according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a ceiling function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs a maximum value out of J and K. Here, in a case that J and K are equal, max(J, K) is a function that outputs J or K. min(L, M) is a function that outputs a maximum value out of L and M. Here, in a case that L and M are equal, min(L, M) is a function that outputs L or M. round(N) is a function that outputs an integer value of a value closest to N.

Figure 1:
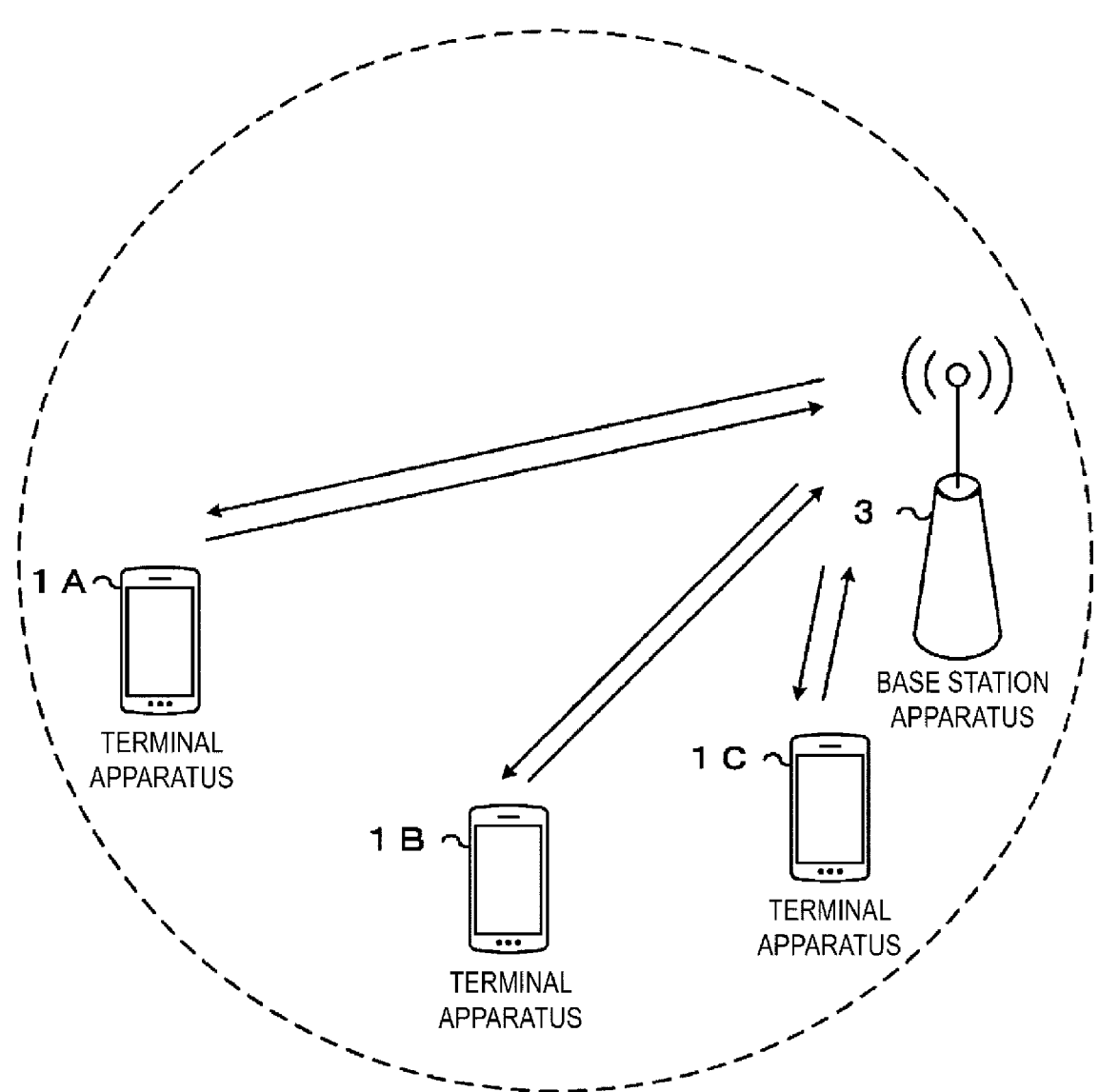
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes at least terminal apparatuses 1A to 1C and a base station apparatus 3 (Base station #3(BS #3)). As a general term for the terminal apparatuses TA to 1C, each terminal apparatus that performs communication with the base station apparatus 3 is hereinafter also referred to as a terminal apparatus 1 (User Equipment #1(UE #1)).

In the radio communication system, at least one communication scheme may be used. The one communication scheme may be Orthogonal Frequency Division Multiplex (OFDM). For example, in the downlink being communication from the base station apparatus 3 to the terminal apparatus 1, Cyclic Prefix-Orthogonal Frequency Division Multiplex (CP-OFDM) may be at least used. In the uplink being communication from the terminal apparatus 1 to the base station apparatus 3, either of CP-OFDM or Discrete Fourier Transform-spread-Orthogonal Frequency Division Multiplex (DFT-s-OFDM) may be at least used. DFT-s-OFDM is a communication scheme in which Transform precoding is applied prior to signal generation in CP-OFDM. Here, transform precoding is also referred to as DFT precoding.

The base station apparatus 3 may include one or more transmission apparatuses (or transmission points, transmission and/or reception apparatuses, transmission and/or reception points). In a case that the base station apparatus 3 includes multiple transmission apparatuses, the multiple transmission apparatuses may be arranged at geographically different positions or may be arranged at the geographically same position. Arranging multiple transmission apparatuses at the geographically same position may mean that the multiple transmission apparatuses are configured as one apparatus.

The base station apparatus 3 may provide one or more serving cells. Each serving cell may be defined as a set of resources used for radio communication. The serving cell is also referred to as a cell.

The serving cell may include at least one downlink component carrier and/or one uplink component carrier. The serving cell may include at least two or more downlink component carriers, and/or two or more uplink component carriers. The downlink component carrier and the uplink component carrier are also referred to as a component carrier.

For example, for one component carrier, one resource grid may be given. For a pair of one component carrier and a certain subcarrier spacing configuration μ, one resource grid may be given. Here, the subcarrier spacing configuration μ is also referred to as numerology. The resource grid includes $N^{size, \mu}_{grid, x} \cdot N^{RB}_{sc}$ subcarriers. The resource grid starts from a common resource block $N^{start}_{grid, x}$. The common resource block $N^{start, \mu}_{grid, x}$ is also referred to as a reference point of the resource grid. The resource grid includes $N^{subframe, \mu}_{symb}$ OFDM symbols. x is a subscript indicating a transmission direction and indicates either of a downlink or an uplink. For a set of a certain antenna port p, a certain subcarrier spacing configuration μ, and a certain transmission direction x, one resource grid is given.

$N^{size, \mu}_{grid, x}$ and $N^{start, \mu}_{grid, x}$ are given based at least on a higher layer parameter (CarrierBandwidth). The higher layer parameter is also referred to as an SCS specific carrier. One resource grid corresponds to one SCS specific carrier. One component carrier may include one or more SCS specific carriers. The SCS specific carrier may be included in system information. For each of the SCS specific carriers, one subcarrier spacing configuration p may be given.

The SubCarrier Spacing (SCS) Δf may be $\Delta f = 2^\mu \cdot 15$ kHz. For example, the subcarrier spacing configuration p may indicate one of 0, 1, 2, 3, or 4.

FIG. 2 is an example illustrating a relationship between the subcarrier spacing configuration μ, the number of OFDM symbols per slot $N^{slot}_{symb}$, and a cyclic Prefix (CP) configuration according to an aspect of the present embodiment. In FIG. 2A, for example, in a case that the subcarrier spacing configuration μ is two and the CP configuration is a normal cyclic prefix (normal CP), $N^{slot}_{symb} = 14$, $N^{frame, \mu}_{slot} = 40$, and $N^{subframe, \mu}_{slot} = 4$. In FIG. 2B, for example, in a case that the subcarrier spacing configuration μ is two and the CP configuration is an extended cyclic prefix (extended CP), $N^{slot}_{symb} = 12$, $N^{fame, \mu}_{slot} = 40$, and $N^{subframe, \mu}_{slot} = 4$.

In the radio communication system according to an aspect of the present embodiment, time unit $T_c$ may be used for expression of the length of the time domain. The time unit $T_c$ is $T_c = 1/(\Delta f_{max} \cdot N_f)$. $\Delta f_{max} = 480$ kHz. $N_f = 4096$. A constant κ is $\kappa = \Delta f_{max} \cdot N/(\Delta f_{ref} N_{f, ref}) = 64$. $\Delta f_{ref}$ is 15 kHz. $N_{f, ref}$ is 2048.

Transmission of a signal in the downlink and/or transmission of a signal in the uplink may be organized into a radio frame (system frame, frame) having the length $T_f$. $T_f = (\Delta f_{max} N_f/100) \cdot T_s = 10$ ms. "·" represents multiplication. The radio frame includes 10 subframes. The length $T_{sf}$ of the subframe is $(\Delta f_{max} N_f/1000) \cdot T_s = 1$ ms. The number of OFDM symbols per subframe is $N^{subframe, \mu}_{symb} = N^{slot}_{symb} N^{subframe, \mu}_{slot}$.

The OFDM symbol is a time domain unit of one communication scheme. For example, the OFDM symbol may be a time domain unit of CP-OFDM. The OFDM symbol may be a time domain unit of DFT-s-OFDM.

The slot may include multiple OFDM symbols. For example, $N^{slot}_{symb}$ consecutive OFDM symbols may be included in one slot. For example, $N^{slot}_{symb}$ may be 14.

The slot may be assigned an index in the time domain. For example, slot indices $n^\mu_s$ may be given in ascending order in the subframe with integer values within a range of 0 to $N^{subframe, \mu}_{slot} - 1$. Slot indices $n^\mu_{s, f}$ may be given in ascending order in the radio frame with integer values within a range of 0 to $N^{frame, \mu}_{slot} - 1$.

Figure 3:
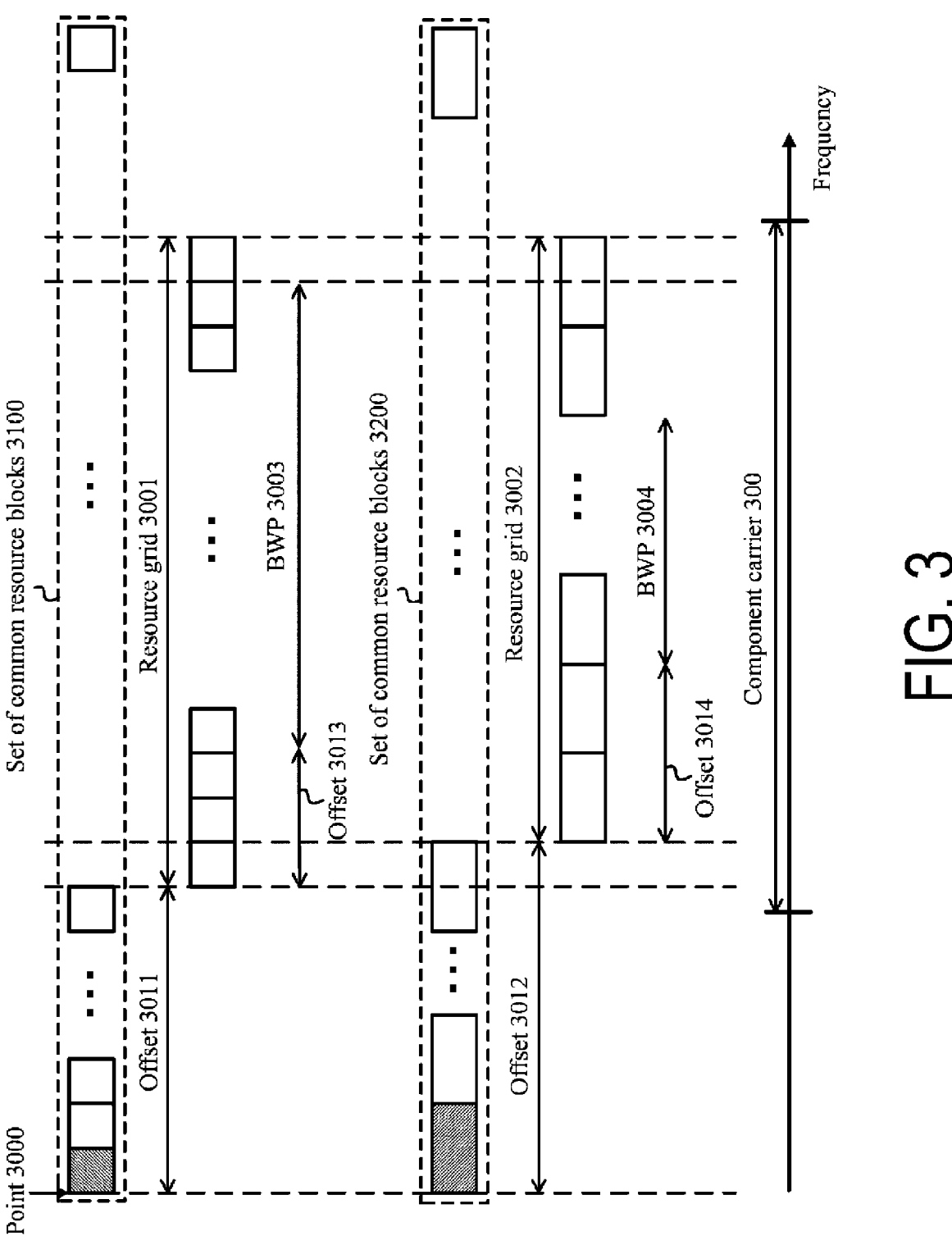
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing configuration $\mu_1$ in a component carrier 300, and a configuration example of a resource grid of a subcarrier spacing configuration $\mu_2$ in the certain component carrier. As described above, for a certain component carrier, one or more subcarrier spacings may be configured.

A Point 3000 is an identifier for identifying a certain subcarrier. The point 3000 is also referred to as a point A. A Common resource block (CRB) set 3100 is a set of common resource blocks for the subcarrier spacing configuration $\mu_1$.

In the common resource block set 3100, a common resource block (block hatched with lines rising diagonally up and to the right in FIG. 3) including the point 3000 is also referred to as a reference point of the common resource block set 3100. The reference point of the common resource block set 3100 is a common resource block having an index of 0 for the subcarrier spacing configuration $\mu_1$.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size, \mu}_{grid1, x}$ common resource blocks starting from the reference point of the resource grid 3001.

An offset 3013 is an offset from the reference point of the resource grid 3001 to a reference point ($N^{start, \mu}_{BWP, i1}$) of a BandWidth Part (BWP) 3003 having an index of i1. The reference point of the BWP 3003 having an index of i1 is a physical resource block having an index of 0 for the BWP.

A common resource block set 3200 is a set of common resource blocks for the subcarrier spacing configuration $\mu_2$.

In the common resource block set 3200, a common resource block (block hatched with lines rising diagonally up and to the left in FIG. 3) including the point 3000 is also referred to as a reference point of the common resource block set 3200. The reference point of the common resource block set 3200 is a common resource block having an index of 0 for the subcarrier spacing configuration μ2.

An offset 3012 is an offset from the reference point of the common resource block set 3200 to a reference point of a resource grid 3002. The offset 3012 is represented by the number of common resource blocks for the subcarrier spacing configuration $\mu_2$. The resource grid 3002 includes $N^{size, \mu}_{grid2, x}$ common resource blocks starting from the reference point of the resource grid 3002.

An offset 3014 is an offset from the reference point of the resource grid 3002 to a reference point ($N^{start, \mu}_{BWP, i2}$) of a BWP 3004 having an index of i2. The reference point of the BWP 3004 having an index of i2 is a physical resource block having an index of 0 for the BWP.

Figure 4:
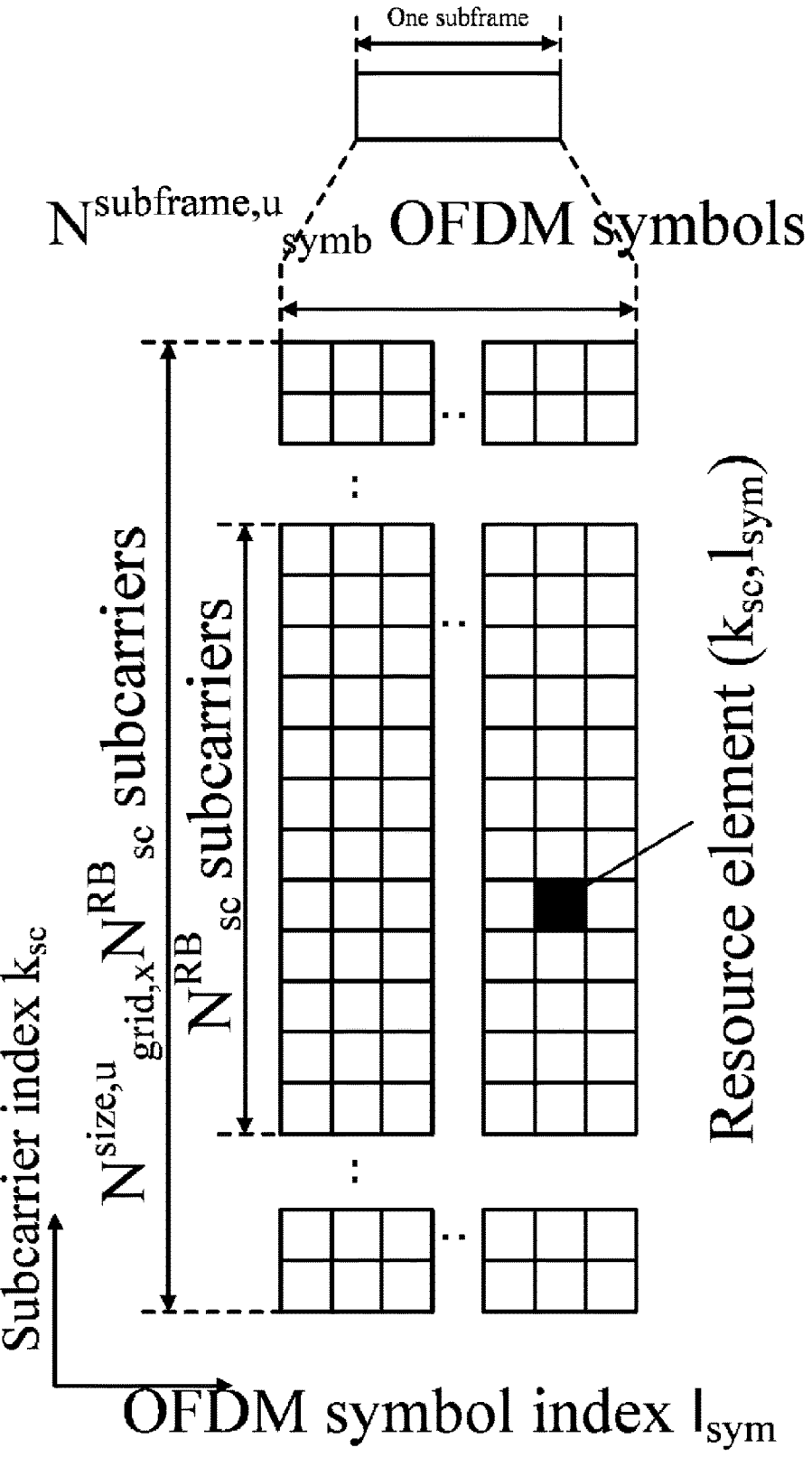
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $l_{sym}$, and the vertical axis corresponds to a subcarrier index $k_{sc}$. The resource grid 3001 includes $N^{size, \mu}_{grid1, x} N^{RB}_{sc}$ subcarriers and includes at least $N^{subframe, \mu}_{symb}$ OFDM symbols. In the resource grid, a resource identified by the subcarrier index $k_{sc}$ and the OFDM symbol index $l_{sym}$ is also referred to as a Resource Element (RE).

The frequency domain of the resource grid corresponds to an SCS-specific carrier. A configuration of the SCS-specific carrier includes a part or all of an offset and a band configuration. The offset indicates an offset from the reference point of the common resource block set to the reference point of the resource grid. For example, each of the offset 3011 and the offset 3012 is an offset included in the configuration of the SCS-specific carrier. The band configuration indicates a bandwidth of the SCS-specific carrier. Here, the bandwidth of the SCS-specific carrier corresponds to a bandwidth of the resource grid. For example, each of $N^{size, \mu}_{grid1, x}$ and $N^{size, \mu}_{grid2, x}$ is a band configuration included in the configuration of the SCS-specific carrier.

The Resource Block (RB) includes $N^{RB}_{sc}$ consecutive subcarriers. The resource block is a general term for a common resource block, a Physical Resource Block (PRB), and a Virtual Resource Block (VRB). For example, $N^{RB}_{sc}$ may be 12.

In the common resource block set for a certain subcarrier spacing configuration $\mu$, the common resource blocks are assigned indices in ascending order from 0 in the frequency domain. The common resource block having an index of 0 for a certain subcarrier spacing configuration $\mu$ includes (or collides with, matches) the point 3000. An index $n^{\mu}_{CRB}$ of the common resource block for a certain subcarrier spacing configuration $\mu$ satisfies a relationship of $n^{\mu}_{CRB} = ceil(k_{sc, c}/N^{RB}_{sc})$. Here, a subcarrier with $k_{sc, c}=0$ is a subcarrier having the same center frequency as the center frequency of a subcarrier corresponding to the point 3000. $k_{sc, c}$ indicates an index of a subcarrier in the common resource block set.

In the physical resource block set for a certain subcarrier spacing configuration $\mu$, the physical resource blocks are assigned indices in ascending order from 0 in the frequency domain. An index $n^{\mu}_{PRB}$ of the physical resource block for a certain subcarrier spacing configuration $\mu$ satisfies a relationship of $n^{\mu}_{CRB} = n^{\mu}_{PRB} + N^{start, \mu}_{BWP, i}$. Here, $N^{start, \mu}_{BWP, i}$ indicates a reference point of the BWP having an index of i.

The BWP may be configured as a part of a frequency band of the component carrier. For example, the BWP may be defined as a subset of common resource blocks included in the resource grid. For example, the BWP may include $N^{size, \mu}_{BWP, i}$ common resource blocks starting from the reference point $N^{start, \mu}_{BWP, i}$ of the BWP. A BWP configured for the downlink is also referred to as a downlink BWP. A BWP configured for the uplink is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. The symbol may correspond to a modulation symbol mapped to a resource element.

In a case that a large scale property of a channel over which a symbol on one antenna port is conveyed can be inferred from a channel over which a symbol on another antenna port is conveyed, the two antenna ports are considered to be in a Quasi Co-Located (QCL) relationship. The large scale property may include at least long term performance of a channel. The large scale property may include at least a part or all of delay spread, Doppler spread, Doppler shift, an average gain, an average delay, and a beam parameter (spatial Rx parameters). The fact that the first antenna port and the second antenna port are QCL with respect to a beam parameter may mean that a reception beam assumed by a receiver for the first antenna port and a reception beam assumed by the receiver for the second antenna port are the same. The fact that the first antenna port and the second antenna port are QCL with respect to a beam parameter may mean that a transmission beam assumed by a receiver for the first antenna port and a transmission beam assumed by the receiver for the second antenna port are the same. In a case that the large scale property of a channel over which a symbol on one antenna port is conveyed can be inferred from a channel over which a symbol on another antenna port is conveyed, the terminal apparatus 1 may assume that the two antenna ports are QCL. The fact that two antenna ports are QCL may mean that the two antenna ports are assumed to be QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated.

Carrier aggregation may mean that communication is performed by using multiple uplink component carriers being aggregated.

Figure 5:
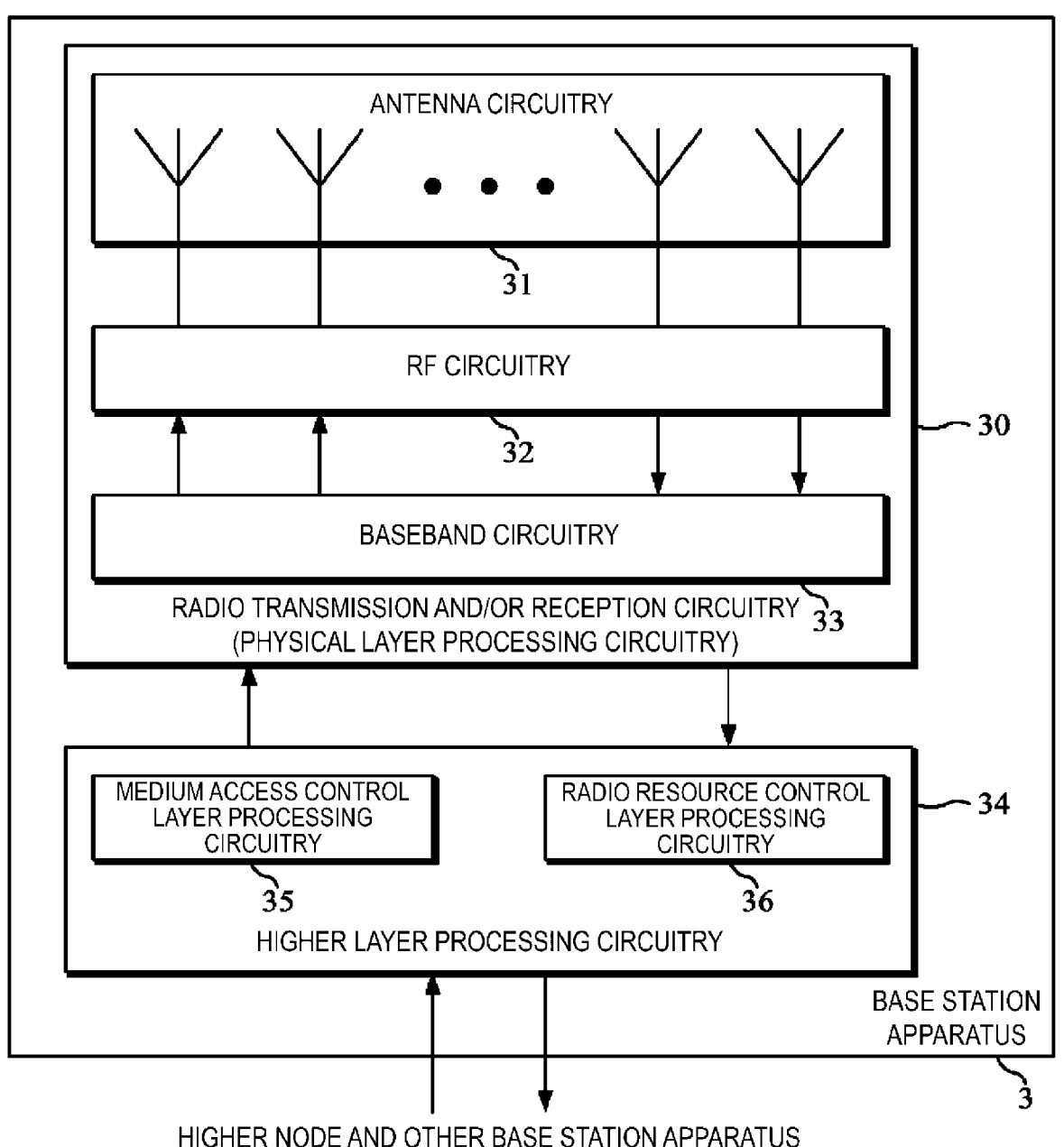
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 includes at least a part or all of a radio transmission and/or reception circuitry (physical layer processing circuitry) 30 and/or a higher layer processing circuitry 34. The radio transmission and/or reception circuitry 30 includes at least a part or all of an antenna circuitry 31, a Radio Frequency (RF) circuitry 32, and a baseband circuitry 33. The higher layer processing circuitry 34 includes at least a part or all of a medium access control layer (MAC layer) processing circuitry 35 and a Radio Resource Control (RRC) layer processing circuitry 36.

The radio transmission and/or reception circuitry 30 includes at least a part or all of a radio transmission circuitry 30a and a radio reception circuitry 30b. Here, apparatus configurations of the baseband circuitry included in the radio transmission circuitry 30a and the baseband circuitry included in the radio reception circuitry 30b may be the same or different from each other. Apparatus configurations of the RF circuitry included in the radio transmission circuitry 30a and the RF circuitry included in the radio reception circuitry 30b may be the same or different from each other. Apparatus configurations of the antenna circuitry included in the radio transmission circuitry 30a and the antenna circuitry included in the radio reception circuitry 30b may be the same or different from each other.

For example, the radio transmission circuitry 30a may generate a baseband signal of a downlink physical channel. For example, the radio transmission circuitry 30a may generate a baseband signal of a downlink physical signal.

For example, the radio reception circuitry 30b may attempt to detect information conveyed on an uplink physical channel. For example, the radio reception circuitry 30b may attempt to detect information conveyed on an uplink physical signal.

The higher layer processing circuitry 34 outputs downlink data (for example, a transport block) to the radio transmission and/or reception circuitry 30 (or the radio transmission circuitry 30*a*). The higher layer processing circuitry 34 performs a part or all of processing operations of a Medium Access Control (MAC) layer, a Packet Data Convergence Protocol (PDCP) layer, a Radio Link Control (RLC) layer, and an RRC layer.

The medium access control layer processing circuitry 35 included in the higher layer processing circuitry 34 performs processing of the MAC layer.

The radio resource control layer processing circuitry 36 included in the higher layer processing circuitry 34 performs processing of the RRC layer. The radio resource control layer processing circuitry 36 manages various pieces of configuration information/parameters (for example, RRC parameters) of the terminal apparatus 1. The radio resource control layer processing circuitry 36 sets the RRC parameter based on an RRC message received from the terminal apparatus 1.

The radio transmission and/or reception circuitry 30 (or the radio transmission circuitry 30*a*) performs a part or all of modulation processing, coding processing, and transmission processing. The radio transmission and/or reception circuitry 30 (or the radio transmission circuitry 30*a*) generates a physical signal through a part or all of modulation processing, coding processing, and baseband signal generation (conversion into a time-continuous signal) processing performed on downlink data. The radio transmission and/or reception circuitry 30 (or the radio transmission circuitry 30*a*) may map the physical signal to a certain component carrier. The radio transmission and/or reception circuitry 30 (or the radio transmission circuitry 30*a*) transmits the generated physical signal.

The radio transmission and/or reception circuitry 30 (or the radio reception circuitry 30*b*) performs a part or all of demodulation processing, decoding processing, and reception processing. The radio transmission and/or reception circuitry 30 (or the radio reception circuitry 30*b*) outputs information detected based at least on demodulation processing and decoding processing performed on a received physical signal to the higher layer processing circuitry 34.

The radio transmission and/or reception circuitry 30 (or the radio reception circuitry 30*b*) may perform carrier sensing prior to transmission of the physical signal.

The RF circuitry 32 converts a signal received via the antenna circuitry 31 into a baseband signal by means of orthogonal demodulation and removes unnecessary frequency components. The RF circuitry 32 outputs an analog signal to the baseband circuitry.

The baseband circuitry 33 converts an analog signal input from the RF circuitry 32 into a digital signal. The baseband circuitry 33 removes a portion corresponding to a Cyclic Prefix (CP) from the converted digital signal, performs a Fast Fourier Transform (FFT) on the signal from which the CP has been removed, and extracts a signal in the frequency domain.

The baseband circuitry 33 performs Inverse Fast Fourier Transform (IFFT) on downlink data to generate an OFDM symbol, adds a CP to the generated OFDM symbol, generates a baseband digital signal, and converts the baseband digital signal into an analog signal. The baseband circuitry 33 outputs the converted analog signal to the RF circuitry 32. Prior to the inverse fast Fourier transform, transform precoding may be applied to the downlink data.

The RF circuitry 32 removes an unnecessary frequency component from the analog signal input from the baseband circuitry 33 by using a low-pass filter, up converts the analog signal into a signal having a carrier frequency, and transmits the signal via the antenna circuitry 31. The RF circuitry 32 may have a function of controlling transmission power. The RF circuitry 32 is also referred to as a transmission power control circuitry.

For the terminal apparatus 1, one or more serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfiguration with synchronization).

The SCell may be included in either of the MCG or the SCG.

A serving cell group (cell group) is a term at least including an MCG and an SCG. The serving cell group may include one or more serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or more downlink BWPs configured for the serving cell (or the downlink component carrier), one downlink BWP may be configured as an active downlink BWP (or one downlink BWP may be activated). Among one or more uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP.

The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP and activating any one of the inactive uplink BWPs other than the one active uplink BWP. The uplink BWP switch may be controlled by a BWP field included in downlink control information. The uplink BWP switch may be controlled based on a higher layer parameter.

Among one or more downlink BWPs configured for the serving cell, two or more downlink BWPs need not be configured for the active downlink BWP. For the serving cell, at certain time, one downlink BWP may be active.

Among one or more uplink BWPs configured for the serving cell, two or more uplink BWPs need not be configured for the active uplink BWP. For the serving cell, at a certain time, one uplink BWP may be active.

Figure 6:
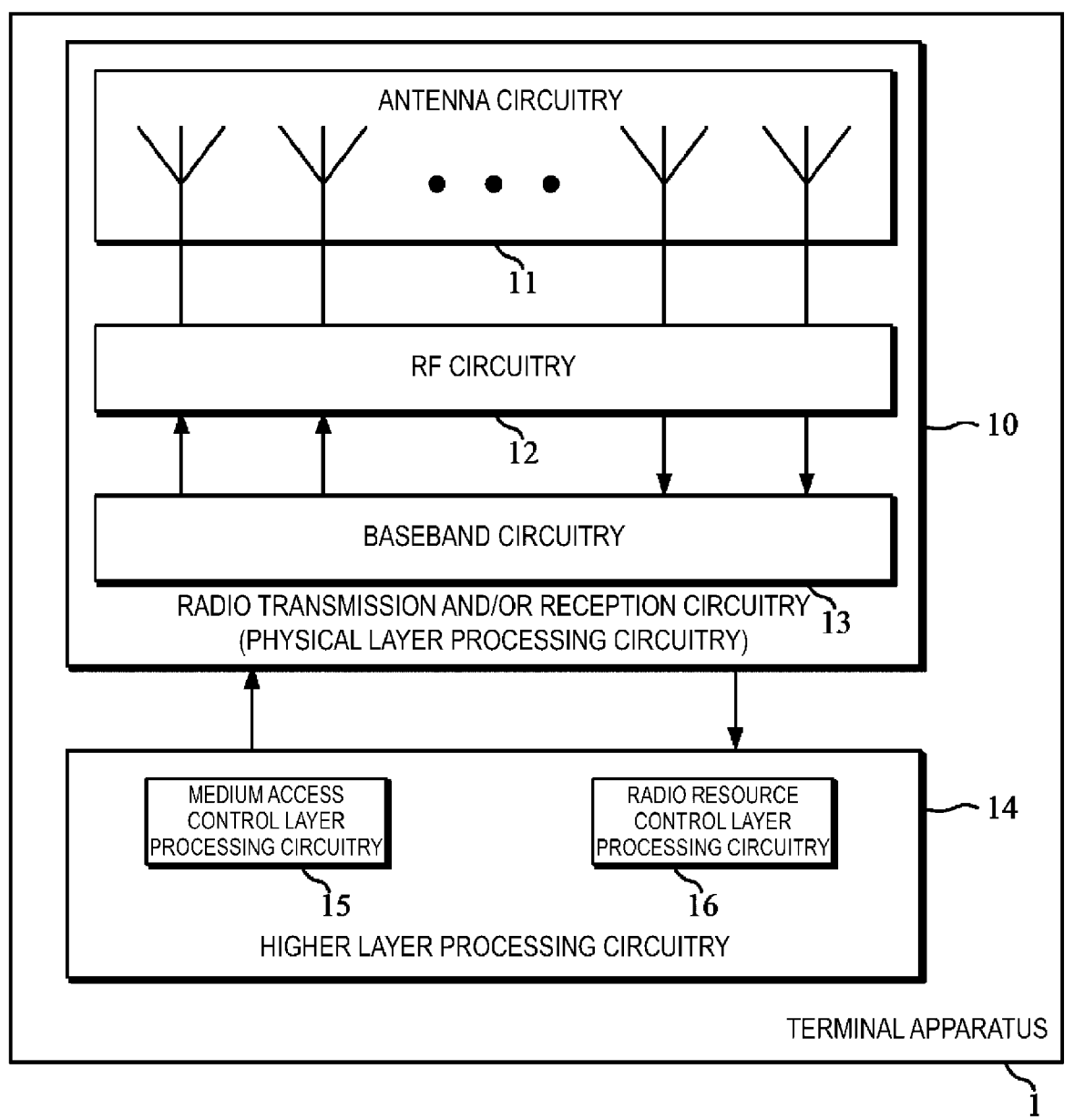
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 includes at least a part or all of a radio transmission and/or reception circuitry (physical layer processing circuitry) 10 and a higher layer processing circuitry 14. The radio transmission and/or reception circuitry 10 includes at least a part or all of an antenna circuitry 11, an RF circuitry 12, and a baseband circuitry 13. The higher layer processing circuitry 14 includes at least a part or all of a medium access control layer processing circuitry 15 and a radio resource control layer processing circuitry 16.

The radio transmission and/or reception circuitry 10 includes at least a part or all of a radio transmission circuitry 10a and a radio reception circuitry 10b. Here, apparatus configurations of the baseband circuitry 13 included in the radio transmission circuitry 10a and the baseband circuitry 13 included in the radio reception circuitry 10b may be the same or different from each other. Apparatus configurations of the RF circuitry 12 included in the radio transmission circuitry 10a and the RF circuitry 12 included in the radio reception circuitry 10b may be the same or different from each other. Apparatus configurations of the antenna circuitry 11 included in the radio transmission circuitry 10a and the antenna circuitry 11 included in the radio reception circuitry 10b may be the same or different from each other.

For example, the radio transmission circuitry 10a may generate a baseband signal of an uplink physical channel. For example, the radio transmission circuitry 10a may generate a baseband signal of an uplink physical signal.

For example, the radio reception circuitry 10b may attempt to detect information conveyed on a downlink physical channel. For example, the radio reception circuitry 10b may attempt to detect information conveyed on an uplink physical signal.

The higher layer processing circuitry 14 outputs uplink data (for example, a transport block) to the radio transmission and/or reception circuitry 10 (or the radio transmission circuitry 10a). The higher layer processing circuitry 14 performs a part or all of processing operations of a MAC layer, a packet data convergence protocol layer, a radio link control layer, and an RRC layer.

The medium access control layer processing circuitry 15 included in the higher layer processing circuitry 14 performs processing of the MAC layer.

The radio resource control layer processing circuitry 16 included in the higher layer processing circuitry 14 performs processing of the RRC layer. The radio resource control layer processing circuitry 16 manages various pieces of configuration information/parameters (for example, RRC parameters) of the terminal apparatus 1. The radio resource control layer processing circuitry 16 sets the RRC parameters based on an RRC message received from the base station apparatus 3.

The radio transmission and/or reception circuitry 10 (or the radio transmission circuitry 10a) performs a part or all of modulation processing, coding processing, and transmission processing. The radio transmission and/or reception circuitry 10 (or the radio transmission circuitry 10a) generates a physical signal through a part or all of modulation processing, coding processing, and baseband signal generation (conversion into a time-continuous signal) processing performed on uplink data. The radio transmission and/or reception circuitry 10 (or the radio transmission circuitry 10a) may map the physical signal to a certain BWP (active uplink BWP). The radio transmission and/or reception circuitry 10 (or the radio transmission circuitry 10a) transmits the generated physical signal.

The radio transmission and/or reception circuitry 10 (or the radio reception circuitry 10b) performs a part or all of demodulation processing, decoding processing, and reception processing. The radio transmission and/or reception circuitry 10 (or the radio reception circuitry 30b) may receive a physical signal in a certain BWP (active downlink BWP) of a certain serving cell. The radio transmission and/or reception circuitry 10 (or the radio reception circuitry 10b) outputs information detected based at least on demodulation processing and decoding processing performed on the received physical signal to the higher layer processing circuitry 14.

The radio transmission and/or reception circuitry 10 (radio reception circuitry 10b) may perform carrier sensing prior to transmission of the physical signal.

The RF circuitry 12 converts a signal received via the antenna circuitry 11 into a baseband signal by means of orthogonal demodulation and removes unnecessary frequency components. The RF circuitry 12 outputs a processed analog signal to the baseband circuitry 13.

The baseband circuitry 13 converts the analog signal input from the RF circuitry 12 into a digital signal. The baseband circuitry 13 removes a portion corresponding to a Cyclic Prefix (CP) from the converted digital signal, performs a Fast Fourier Transform (FFT) on the signal from which the CP has been removed, and extracts a signal in the frequency domain.

The baseband circuitry 13 performs Inverse Fast Fourier Transform (IFFT) on uplink data to generate an OFDM symbol, adds a CP to the generated OFDM symbol, generates a baseband digital signal, and converts the baseband digital signal into an analog signal. The baseband circuitry 13 outputs the converted analog signal to the RF circuitry 12. Prior to the inverse fast Fourier transform, transform precoding may be applied to the uplink data.

The RF circuitry 12 removes unnecessary frequency components from the analog signal input from the baseband circuitry 13 through a low-pass filter, up converts the analog signal into a signal having a carrier frequency, and transmits the signal via the antenna circuitry 11. The RF circuitry 12 may have a function of controlling transmission power. The RF circuitry 12 is also referred to as a transmission power control circuitry.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the uplink of the radio communication system according to an aspect of the present embodiment, at least a part or all of the following uplink physical channels may be used.

Physical Uplink Control CHannel (PUCCH)

Physical Uplink Shared CHannel (PUSCH)

Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) includes at least a part or all of Channel State Information (CSI), a Scheduling Request (SR), and Hybrid Automatic Repeat request ACKnowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as a HARQ-ACK information bit or a HARQ-ACK information sequence.

The HARQ-ACK information may include at least a HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared CHannel (PUSCH)). The HARQ-ACK may indicate an acknowledgement (ACK) or a negative-acknowledgement (NACK) corresponding to the transport block. The ACK may indicate that decoding of the transport block has been decoded successfully. The NACK may indicate that decoding of the transport block has not been decoded successfully. The HARQ-ACK information may include a HARQ-ACK codebook including one or more HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for new transmission. The scheduling request bit may be used for indicating either of a positive SR or a negative SR. The scheduling request bit indicating the positive SR is also referred to as "the positive SR being transmitted". The positive SR may indicate that a resource of the PUSCH (or the UL-SCH) for new transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for new transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least a part or all of a Channel Quality Indicator (CQI), a Precoder Matrix Indicator (PMI), and a Rank Indicator (RI). The CQI is an indicator related to quality (for example, propagation strength) of a propagation path or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1 based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. Transmission of the PRACH may mean transmission of a random access preamble. A PRACH sequence $x_{u,v}(n)$ is defined by $x_{u,v}(n)=x_u(\mathrm{mod}(n+C_v, L_{RA}))$. $x_u$ may be a Zadoff Chu (ZC) sequence. $x_u$ is defined by $x_u=\exp(-j\pi ui(i+1)/L_{RA})$. j is an imaginary unit. $\pi$ is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. Each of the random access preambles is identified (determined, given) based at least on the cyclic shift $C_v$ of the PRACH sequence and the sequence index u for the PRACH sequence. Each of the 64 identified random access preambles may be assigned an index.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the uplink of the radio communication system according to an aspect of the present embodiment, at least a part or all of the following uplink physical signals may be used.

UpLink Demodulation Reference Signal (UL DMRS)

Sounding Reference Signal (SRS)

UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated (or may be scheduled) by one DCI format. The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a propagation path of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated (or may be triggered) by one DCI format. Resource element mapping of the PUCCH and/or resource element mapping of the DMRS for the PUCCH may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a propagation path of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the downlink of the radio communication system according to an aspect of the present embodiment, at least a part or all of the following downlink physical channels may be used.

Physical Broadcast Channel (PBCH)

Physical Downlink Control Channel (PDCCH)

Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or more higher layer parameters.

The physical layer control information includes 8 bits. The physical layer control information may include at least a part or all of the following 0A to 0D.

0A) Radio frame bit

0B) Half radio frame (half system frame, half frame) bit

0C) SS/PBCH block index bit

0D) Subcarrier offset bit

The radio frame bit is used for indicating a radio frame in which the PBCH is transmitted (radio frame including a slot in which the PBCH is transmitted). The radio frame bit includes 4 bits. The radio frame bit may include 4 bits out of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits out of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

A DCI format 0_0, a DCI format 0_1, a DCI format 1_0, and a DCI format 1_1 are DCI formats including a set of fields different from each other. An uplink DCI format is a general term for the DCI format 0_0 and the DCI format 0_1. A downlink DCI format is a general term for the DCI format 1_0 and the DCI format 1_1.

The DCI format 0_0 is at least used for scheduling the PUSCH of a certain cell (or mapped to a certain cell). The DCI format 0_0 includes at least a part or all of fields listed from 1A to 1E.

1A) Identifier field for DCI formats

1B) Frequency domain resource assignment field

1C) Time domain resource assignment field

1D) Frequency hopping flag field

1E) Modulation and Coding Scheme (MCS) field

The identifier field for DCI formats may indicate whether the DCI format including the identifier field for DCI formats is an uplink DCI format or a downlink DCI format. The identifier field for DCI formats included in the DCI format 0_0 may indicate 0 (or may indicate that the DCI format 0_0 is an uplink DCI format).

The frequency domain resource assignment field included in the DCI format 00 may be at least used for indicating assignment of frequency resources for the PUSCH.

The time domain resource assignment field included in the DCI format 0_0 may be at least used for indicating assignment of time resources for the PUSCH.

The frequency hopping flag field may be at least used for indicating whether frequency hopping is applied to the PUSCH.

The MCS field included in the DCI format 0_0 may be at least used for indicating a part or all of a modulation scheme for the PUSCH and/or a target coding rate. The target coding rate may be a target coding rate for the transport block of the PUSCH. The Transport Block Size (TBS) of the PUSCH may be given based at least on a part or all of the target coding rate and the modulation scheme for the PUSCH.

The DCI format 0_0 need not include a field used for a CSI request. In other words, CSI need not be requested by using the DCI format 0_0.

The DCI format 0_0 need not include a carrier indicator field. In other words, the uplink component carrier to which the PUSCH scheduled by a DCI format 0_0 is mapped may be the same as the downlink component carrier to which the PDCCH including the DCI format 0_0 is mapped.

The DCI format 0_0 need not include the BWP field. In other words, the uplink BWP to which the PUSCH scheduled by a DCI format 0_0 is mapped may be the same as the downlink BWP to which the PDCCH including the DCI format 00 is mapped.

The DCI format 0_1 is at least used for scheduling of the PUSCH of a certain cell (mapped to a certain cell). The DCI format 0_1 includes at least a part or all of fields listed from 2A to 2H.

2A) Identifier field for DCI formats

2B) Frequency domain resource assignment field

2C) Uplink time domain resource assignment field

2D) Frequency hopping flag field

2E) MCS field

2F) CSI request field

2G) BWP field

2H) Carrier indicator field

The identifier field for DCI formats included in the DCI format 0_1 may indicate 0 (or may indicate that the DCI format 01 is an uplink DCI format).

The frequency domain resource assignment field included in the DCI format 01 may be at least used for indicating assignment of frequency resources for the PUSCH.

The time domain resource assignment field included in the DCI format 0_1 may be at least used for indicating assignment of time resources for the PUSCH.

The MCS field included in the DCI format 0_1 may be at least used for indicating a part or all of a modulation scheme for the PUSCH and/or a target coding rate.

In a case that the BWP field is included in the DCI format 0_1, the BWP field may be used for indicating an uplink BWP to which the PUSCH is mapped. In a case that the BWP field is not included in the DCI format 0_1, the uplink BWP to which the PUSCH is mapped may be the same as the uplink BWP to which the PDCCH including the DCI format 0_1 used for scheduling of the PUSCH is mapped. In a case that the number of uplink BWPs configured for the terminal apparatus 1 in a certain uplink component carrier is two or more, the number of bits of the BWP field included in the DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in the DCI format 0_1 used for scheduling of the PUSCH mapped to the certain uplink component carrier may be 0 bits (or the BWP field need not be included in the DCI format 0_1 used for scheduling of the PUSCH mapped to the certain uplink component carrier).

The CSI request field is at least used for indicating the report of the CSI.

In a case that the carrier indicator field is included in the DCI format 0_1, the carrier indicator field may be used for indicating the uplink component carrier to which the PUSCH is mapped. In a case that the carrier indicator field is not included in the DCI format 0_1, the uplink component carrier to which the PUSCH is mapped may be the same as the uplink component carrier to which the PDCCH including the DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in the DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in the DCI format 0_1 used for scheduling of the PUSCH mapped to the certain serving cell group may be 0 bits (or the carrier indicator field need not be included in the DCI format 0_1 used for scheduling of the PUSCH mapped to the certain serving cell group).

The DCI format 1_0 is at least used for scheduling of the PDSCH of a certain cell (mapped to a certain cell). The DCI format 1_0 includes at least a part or all of 3A to 3F.

3A) Identifier field for DCI formats

3B) Frequency domain resource assignment field

3C) Time domain resource assignment field

3D) MCS field

3E) PDSCH to HARQ feedback timing indicator field

3F) PUCCH resource indicator field

The identifier field for DCI formats included in the DCI format 1_0 may indicate 1 (or may indicate that the DCI format 1_0 is a downlink DCI format).

The frequency domain resource assignment field included in the DCI format 1_0 may be at least used for indicating assignment of frequency resources for the PDSCH.

The time domain resource assignment field included in the DCI format 1_0 may be at least used for indicating assignment of time resources for the PDSCH.

The MCS field included in the DCI format 1_0 may be at least used for indicating a part or all of a modulation scheme for the PDSCH and/or a target coding rate. The target coding rate may be a target coding rate for the transport block of the PDSCH. The Transport Block Size (TBS) of the PDSCH may be given based at least on a part or all of the target coding rate and the modulation scheme for the PDSCH.

The PDSCH to HARQ feedback timing indicator field may be at least used for indicating an offset from the slot including the last OFDM symbol of the PDSCH to the slot including the first OFDM symbol of the PUCCH.

The PUCCH resource indicator field may be a field indicating an index of one of one or more PUCCH resources included in a PUCCH resource set. The PUCCH resource set may include one or more PUCCH resources.

The DCI format 1_0 need not include the carrier indicator field. In other words, the downlink component carrier to which the PDSCH scheduled by using a DCI format 1_0 is mapped may be the same as the downlink component carrier to which the PDCCH including the DCI format 1_0 is mapped.

The DCI format 1_0 need not include the BWP field. In other words, the downlink BWP to which the PDSCH scheduled by using a DCI format 1_0 is mapped may be the same as the downlink BWP to which the PDCCH including the DCI format 1_0 is mapped.

The DCI format 1_1 is at least used for scheduling the PDSCH of a certain cell (or mapped to a certain cell). The DCI format 1_1 includes at least a part or all of 4A to 4I.

4A) Identifier field for DCI formats
4B) Frequency domain resource assignment field
4C) Time domain resource assignment field
4E) MCS field
4F) PDSCH to HARQ feedback timing indicator field
4G) PUCCH resource indicator field
4H) BWP field
4I) Carrier indicator field The identifier field for DCI formats included in the DCI format 1_1 may indicate 1 (or may indicate that the DCI format 1_1 is a downlink DCI format).

The frequency domain resource assignment field included in the DCI format 11 may be at least used for indicating assignment of frequency resources for the PDSCH.

The time domain resource assignment field included in the DCI format 1_1 may be at least used for indicating assignment of time resources for the PDSCH.

The MCS field included in the DCI format 1_1 may be at least used for indicating a part or all of the modulation scheme for the PDSCH and/or the target coding rate.

In a case that the PDSCH to HARQ feedback timing indicator field is included in the DCI format 1_1, the PDSCH to HARQ feedback timing indicator field may be at least used for indicating an offset from the slot including the last OFDM symbol of the PDSCH to the slot including the first OFDM symbol of the PUCCH. In a case that the PDSCH to HARQ feedback timing indicator field is not included in the DCI format 1_1, an offset from the slot including the last OFDM symbol of the PDSCH to the slot including the first OFDM symbol of the PUCCH may be identified by a higher layer parameter.

The PUCCH resource indicator field may be a field indicating an index of one of one or more PUCCH resources included in a PUCCH resource set.

In a case that the BWP field is included in the DCI format 1_1, the BWP field may be used for indicating the downlink BWP to which the PDSCH is mapped. In a case that the BWP field is not included in the DCI format 1_1, the downlink BWP to which the PDSCH is mapped may be the same as the downlink BWP to which the PDCCH including the DCI format 1_1 used for scheduling of the PDSCH is mapped. In a case that the number of downlink BWPs configured for the terminal apparatus 1 in a certain downlink component carrier is two or more, the number of bits of the BWP field included in the DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in the DCI format 1_1 used for scheduling of the PDSCH mapped to the certain downlink component carrier may be 0 bits (or the BWP field need not be included in the DCI format 1_1 used for scheduling of the PDSCH mapped to the certain downlink component carrier).

In a case that the carrier indicator field is included in the DCI format 1_1, the carrier indicator field may be used for indicating the downlink component carrier to which the PDSCH is mapped. In a case that the carrier indicator field is not included in the DCI format 1_1, the downlink component carrier to which the PDSCH is mapped may be the same as the downlink component carrier to which the PDCCH including the DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in the DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in the DCI format 1_1 used for scheduling of the PDSCH mapped to the certain serving cell group may be 0 bits (or the carrier indicator field need not be included in the DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the downlink of the radio communication system according to an aspect of the present embodiment, at least a part or all of the following downlink physical signals may be used.

Synchronization signal (SS)
DownLink DeModulation Reference Signal (DL DMRS)
Channel State Information-Reference Signal (CSI-RS)
DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
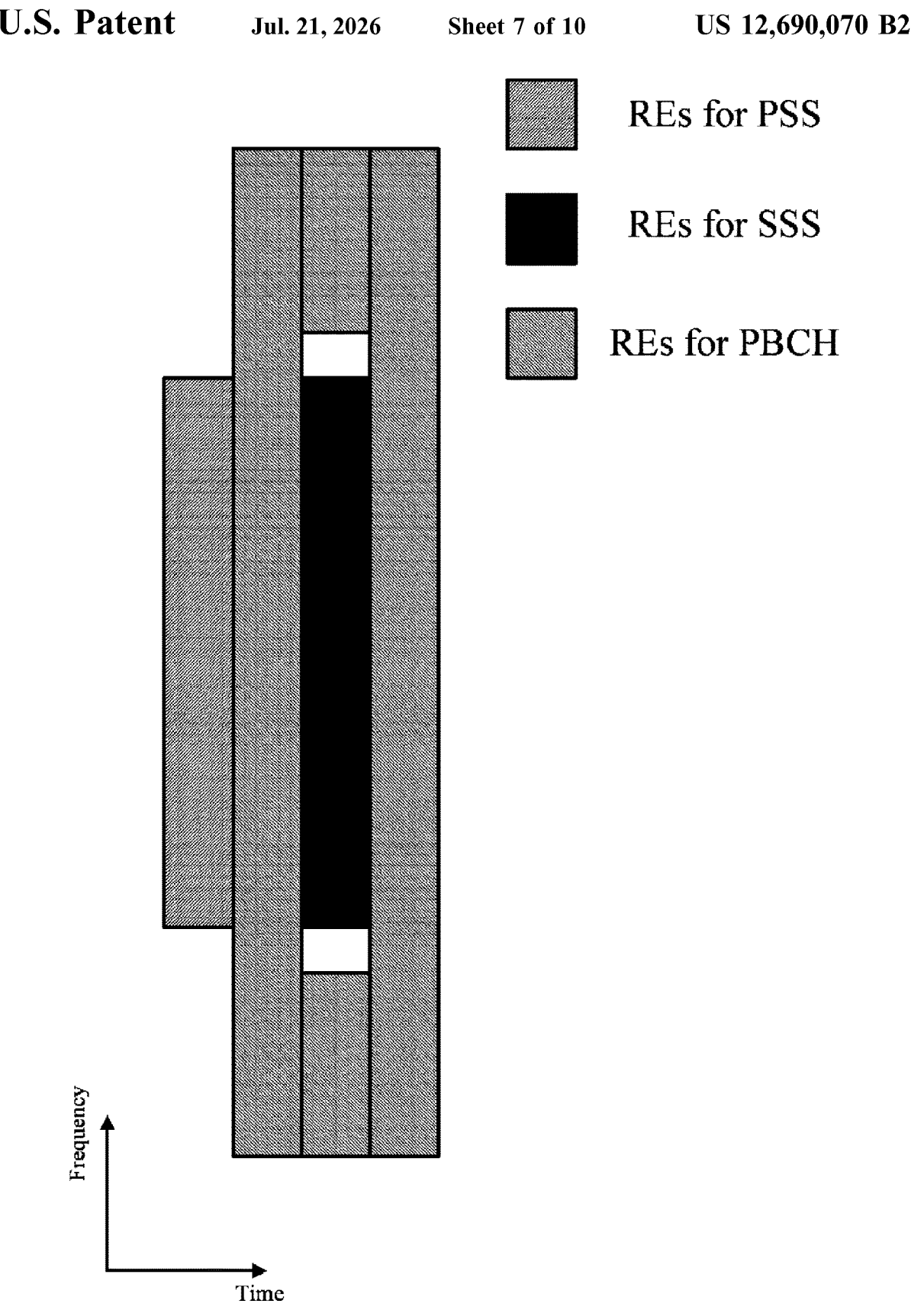
FIG. 7 is a diagram illustrating a configuration example of an SS/PBCH block according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $1_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four consecutive OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH over which the symbol of the PBCH on a certain antenna port is conveyed may be inferred from the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a propagation path of the PDSCH may be inferred from the DMRS for the PDSCH. In a case that a set of resource elements in which the symbol of a certain PDSCH is conveyed and a set of resource elements in which the symbol of the DMRS for the certain PDSCH is conveyed are included in the same Precoding Resource Group (PRG), the PDSCH over which the symbol of the PDSCH on a certain antenna port is conveyed may be inferred from the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a propagation path of the PDCCH may be inferred from the DMRS for the PDCCH. In a case that the same precoder is (assumed to be) applied to a set of resource elements in which the symbol of a certain PDCCH is conveyed and a set of resource elements in which the symbol of the DMRS for the certain PDCCH is conveyed, the PDCCH over which the symbol of the PDCCH on a certain antenna port is conveyed may be inferred from the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. The Common Control CHannel (CCCH) may be used for transmitting a common RRC message in multiple terminal apparatuses 1. Here, the CCCH may be, for example, used for the terminal apparatus 1 that is not in a state of RRC connection. The Dedicated Control CHannel (DCCH) may be at least used for transmitting an RRC message dedicated to the terminal apparatus 1. Here, the DCCH may be, for example, used for the terminal apparatus 1 that is in a state of RRC connection.

The RRC message includes one or more RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Element (MAC CE). In other words, the higher layer parameter is a general term for the MIB, the system information, a message corresponding to the CCCH, a message corresponding to the DCCH, and parameters included in the MAC CE. The parameters included in the MAC CE are transmitted by a MAC Control Element (CE) command.

Procedures performed by the terminal apparatus 1 include at least a part or all of the following 5A to 5C.

5A) Cell search

5B) Random access

5C) Data communication

The cell search is a procedure used for the terminal apparatus 1 synchronizing with a certain cell related to the time domain and the frequency domain and detecting a physical cell identity (physical cell ID). In other words, by means of the cell search, the terminal apparatus 1 may perform synchronization with a certain cell in the time domain and the frequency domain and detect a physical cell ID.

A sequence of the PSS is given based at least on the physical cell ID. A sequence of the SSS is given based at least on the physical cell ID.

An SS/PBCH block candidate indicates a resource allowed to (possible to, scheduled to, configured to, defined to, having a possibility to) transmit the SS/PBCH block.

A set of SS/PBCH block candidates in a certain half radio frame is also referred to as an SS burst set. The SS burst set is also referred to as a transmission window, an SS transmission window, or a Discovery Reference Signal (DRS) transmission window. The SS burst set is a general term including at least a first SS burst set and a second SS burst set.

The base station apparatus 3 transmits SS/PBCH blocks with one or more indices in a prescribed periodicity. The terminal apparatus 1 may detect at least one SS/PBCH block out of the SS/PBCH blocks with one or more indices and attempt decoding of the PBCH included in the at least one SS/PBCH block.

The random access is a procedure including at least a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or more PRACH occasions based at least on the index of the SS/PBCH block candidate detected based on the cell search. Each of the PRACH occasions is defined based at least on resources in the time domain and the frequency domain.

The terminal apparatus 1 transmits one random access preamble selected out of the PRACH occasions corresponding to the indices of the SS/PBCH block candidates in which the SS/PBCH block is detected.

The message 2 is a procedure for attempting to detect a DCI format 1_0 with a Cyclic Redundancy Check (CRC) scrambled with a Random Access-Radio Network Temporary Identifier (RA-RNTI) by the terminal apparatus 1. The terminal apparatus 1 attempts detection of the PDCCH including the DCI format in a control resource set given based on the MIB, which is included in the PBCH included in the SS/PBCH block detected based on cell search, and in resources indicated based on a configuration of a search space set. The message 2 is also referred to as a random access response.

The message 3 is a procedure for transmitting the PUSCH scheduled by using a random access response grant included in a DCI format 1_0 detected through the procedure of the message 2. Here, the random access response grant is indicated by the MAC CE included in the PDSCH scheduled by using the DCI format 1_0.

The PUSCH scheduled based on the random access response grant is either a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled by using a DCI format 0_0 with a CRC scrambled based on a Temporary Cell-Radio Network Temporary Identifier (TC-RNTI).

The message 4 is a procedure for attempting to detect a DCI format 1_0 with a CRC scrambled based on either of a Cell-Radio Network Temporary Identifier (C-RNTI) or a TC-RNTI. The terminal apparatus 1 receives a PDSCH scheduled based on the DCI format 1_0. The PDSCH may include a contention resolution ID.

Data communication is a general term for downlink communication and uplink communication.

In the data communication, the terminal apparatus 1 attempts detection of the PDCCH (monitors the PDCCH, supervises the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping) or may include distributed resources (interleaver mapping).

A set of resource blocks constituting the control resource set may be indicated by the higher layer parameter. The number of OFDM symbols constituting the control resource set may be indicated by the higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set or may be a UE-specific Search Space (USS) set.

The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by the higher layer parameter.

For a certain search space set, a part or all of 6A to 6C may be indicated by at least the higher layer parameter.

6A) PDCCH monitoring periodicity
6B) PDCCH monitoring pattern within a slot
6C) PDCCH monitoring offset The monitoring occasion of a certain search space set may correspond to the OFDM symbol to which the first OFDM symbol of a control resource set related to the certain search space set is mapped. The monitoring occasion of a certain search space set may correspond to a resource of a control resource set starting from the first OFDM symbol of the control resource set related to the certain search space set. The monitoring occasion of the search space set is given based at least on a part or all of the monitoring periodicity of the PDCCH, the monitoring pattern of the PDCCH in a slot, and the monitoring offset of the PDCCH.

Figure 8:
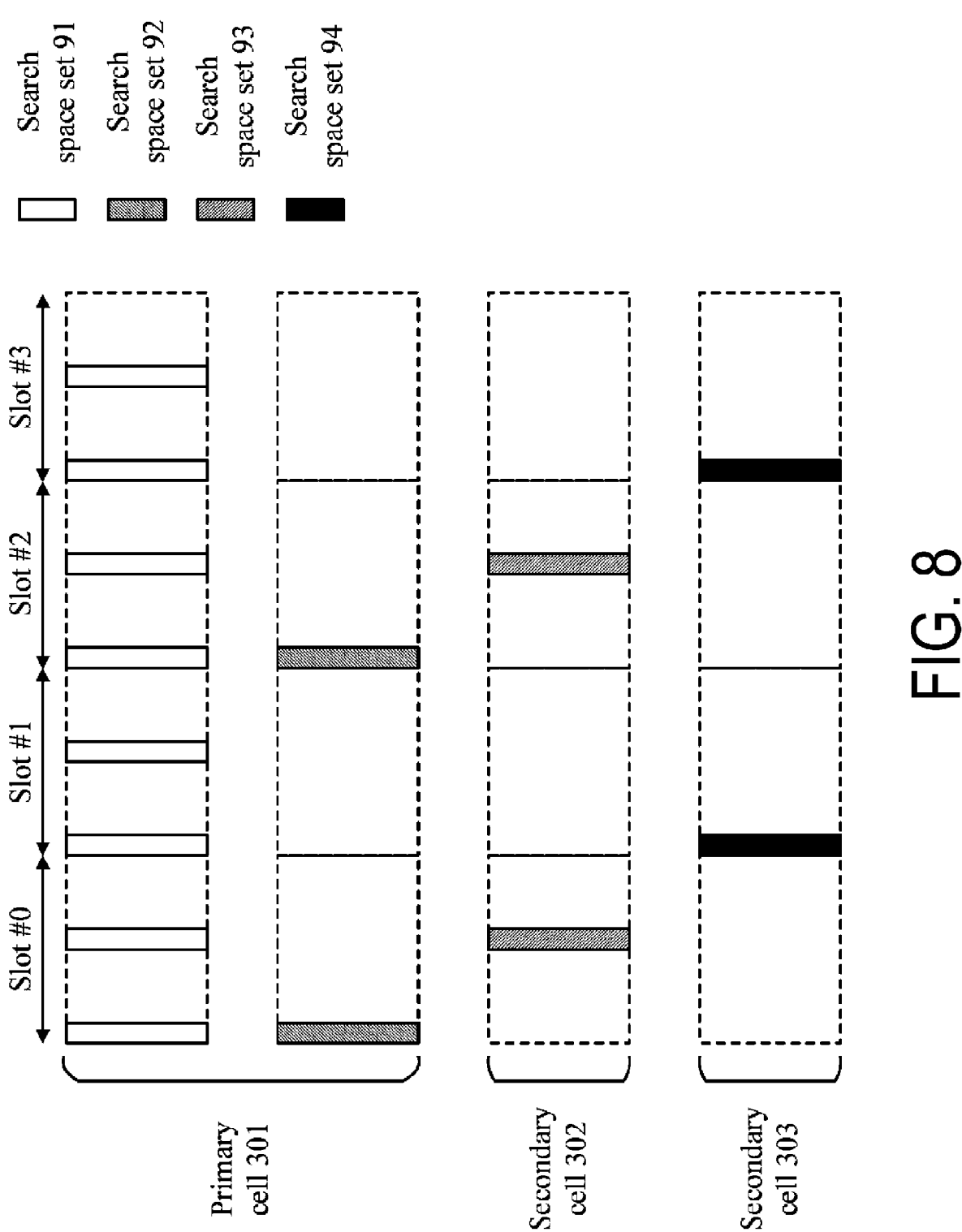
FIG. 8 is a diagram illustrating an example of monitoring occasions for search space sets according to an aspect of the present embodiment.

FIG. 8 is a diagram illustrating an example of the monitoring occasions for the search space sets according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasions for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In the downlink communication, the terminal apparatus 1 detects a downlink DCI format. The detected downlink DCI format is at least used for resource assignment of the PDSCH. The detected downlink DCI format is also referred to as a downlink assignment. The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In the uplink communication, the terminal apparatus 1 detects an uplink DCI format. The detected DCI format is at least used for resource assignment of the PUSCH. The detected uplink DCI format is also referred to as an uplink grant. The terminal apparatus 1 performs transmission of the PUSCH.

In configured grant, the uplink grant for scheduling the PUSCH is configured for each transmission periodicity of the PUSCH. A part or all of pieces of information indicated by an uplink DCI format in a case that the PUSCH is scheduled by the uplink DCI format may be indicated by the uplink grant configured in a case of the configured grant.

The terminal apparatus 1 may transmit the PRACH in the message 1 in the random access. Here, a random access preamble index signaled to the base station apparatus 3 through the PRACH may be provided from the medium access control layer processing circuitry 15. Here, the random access preamble index may be used for identifying a random access preamble included in one PRACH occasion.

The type of PRACH resource may be determined by the medium access control layer processing circuitry 15. Here, the PRACH resource may include at least a part or all of a time domain resource, a frequency domain resource, and a code domain resource. For example, the random access preamble may correspond to a code domain resource. The PRACH occasion may correspond to a time domain resource and a frequency domain resource.

For example, the medium access control layer processing circuitry 15 may determine one of a first PRACH resource type and a second PRACH resource type, and signal the determined type to the radio transmission and/or reception circuitry 10. Here, the first PRACH resource type and the second PRACH resource type may be provided for the uplink BWP used for the random access by the radio resource control layer processing circuitry 16. Note that the first PRACH resource type may be configured for each uplink BWP. The second PRACH resource type may be configured for each uplink BWP.

For example, the first PRACH resource type may correspond to a first random access preamble group included in a certain PRACH occasion. The second PRACH resource type may correspond to a second random access preamble group included in the certain PRACH occasion. Here, the random access preamble group is a group including one or more random access preambles. For example, the first random access preamble group may include random access preambles having indexes of 0 to 9, and the second random access preamble group may include random access preamble groups having indexes of 10 to 19. The first random access preamble group may include random access preambles having indexes of 7 to 15, and the second random access preamble group may include random access preamble groups having indexes of 38 to 50. In other words, the first random access preamble group and the second random access preamble group may be different from each other.

For example, the first PRACH resource type may correspond to a first PRACH occasion starting from a first subcarrier position, and the second PRACH resource type may correspond to a second PRACH occasion starting from a second subcarrier position. For example, the radio resource control layer processing circuitry 16 may provide configuration information of the first subcarrier position to one or both of the medium access control layer processing circuitry 16 and the radio transmission and/or reception circuitry 10. The radio resource control layer processing circuitry 16 may provide configuration information of the second subcarrier position to one or both of the medium access control layer processing circuitry 16 and the radio transmission and/or reception circuitry 10. Here, a temporal position at which the first PRACH occasion starts may be the same as or different from a temporal position at which the second PRACH occasion starts.

The subcarrier position may be identified based at least on one or both of a resource block index and a subcarrier index. The temporal position may be identified by some or all of a frame index, a subframe index, a slot index, and an OFDM symbol index.

For example, the first PRACH resource type may correspond to the first PRACH occasion starting from a first temporal position, and the second PRACH resource type may correspond to the second PRACH occasion starting from a second temporal position. For example, the radio resource control layer processing circuitry 16 may provide configuration information of the first temporal position to one or both of the medium access control layer processing circuitry 16 and the radio transmission and/or reception circuitry 10. The radio resource control layer processing circuitry 16 may provide configuration information of the second temporal position to one or both of the medium access control layer processing circuitry 16 and the radio transmission and/or reception circuitry 10. Here, the subcarrier position at which the first PRACH occasion starts may be the same as or different from the subcarrier position at which the second PRACH occasion starts.

For example, the first PRACH resource type may be configured by a first RRC parameter provided by the radio resource control layer processing circuitry 16. The second PRACH resource type may be configured by a second RRC parameter that is provided by the radio resource control layer processing circuitry 16 and is different from the first RRC parameter.

For example, in a Contention-Based Random Access (CBRA), the terminal apparatus 1 may determine a PRACH resource type for the transmission of the PRACH. Here, in order to determine the PRACH resource type, one or both of 1) information related to a reception quality of the downlink signal specified for the random access and 2) information related to the transmission power of the PRACH may be used.

For example, the information related to the reception quality of the downlink signal specified for the random access may be a Reference Signal Received Power (RSRP) of the downlink signal specified for the random access. Here, the RSRP may be information of the received power quantized by a prescribed rule. Here, the downlink signal specified for the random access may be the downlink signal selected by the terminal apparatus 1. For example, in a case that the base station apparatus 3 configures a transmission of the SS/PBCH blocks having multiple indexes, the terminal apparatus 1 may specify the SS/PBCH block having one of the indexes for the random access. Here, in order to specify the downlink signal, comparison of the RSRP of the respective downlink signals may be used.

For example, multiple downlink signals may be specified for the random access. In a case that multiple downlink signals are specified for the random access, the information related to the reception quality of the downlink signal specified for the random access may be determined by use of the multiple downlink signals. For example, the information related to the reception quality of the downlink signal specified for the random access may be provided based on an average value of the respective RSRP of the multiple downlink signals.

For example, the information related to the transmission power of the PRACH may be a transmission power value of the PRACH. For example, the information related to the transmission power of the PRACH may be a counter value that is incremented for each transmission of the PRACH in the random access. The information related to the transmission power of the PRACH may be a counter value used for configuring a power of the PRACH. The information related to the transmission power of the PRACH may be a power headroom for the PRACH.

Here, a transmission power value $P_{PRACH}$ of the PRACH may be calculated using $P_{PRACH}=\min(P_{CMAX}, P_{target}+PL)$. Here, $P_{CMAX}$ represents a maximum transmission power value configured for an uplink carrier on which the transmission of the PRACH is performed. The maximum transmission power value configured for the uplink carrier may be determined based on a band of the uplink carrier and other various configuration information. $P_{target}$ may be determined based on the counter value used for configuring the power of the PRACH.

For example, $P_{target}$ may be calculated using $P_{target}=P_{PRTP}+D_P+(N_{counter}-1)\times P_{STEP}+P_{offset}$. Here, $P_{PTRP}$ represents a value configured as a target received power of the random access preamble. $D_P$ represents an offset value of a power depending on a PRACH format. $N_{counter}$ represents a value of a counter value used for configuring the power of the PRACH. $P_{offset}$ represents an offset configured based on a type of random access. The type of random access may include a 4-step random access and a 2-step random access. For example, $P_{offset}$ may be configured equal to a nonzero value in a case that the type of random access is the 2-step random access, and may be configured to 0 in a case that the type of random access is the 4-step random access.

For example, $P_{target}$ may be determined further based on a second offset value $P_{offset2}$. Here, $P_{offset2}$ may be determined based on the PRACH resource type used for the transmission of the PRACH. For example, $P_{offset2}$ may have a value of 0 in a case that the PRACH resource type used for the transmission of the PRACH is the first PRACH resource type, and may have a nonzero value in a case that the PRACH resource type used for the transmission of the PRACH is the second PRACH resource type. Here, the radio resource control layer processing circuitry 16 may provide the nonzero value to one or both of the medium access control layer processing circuitry 15 and the radio transmission and/or reception circuitry 10.

For example, a counter value may be set for each PRACH resource type. For example, a first counter value may be configured for the first PRACH resource type and a second counter value may be configured for the second PRACH resource type. For example, the first counter value may be a counter value that is incremented in a case that the PRACH is transmitted in the PRACH resource included in the first PRACH resource type and the downlink signal specified for the random access is not changed. The second counter value may be a counter value that is incremented in a case that the PRACH is transmitted in the PRACH resource included in the second PRACH resource type and the downlink signal specified for the random access is not changed. In other words, the second counter value may not be incremented in the case that the PRACH is transmitted in the PRACH resource included in the first PRACH resource type. The second counter value may not be incremented in a case that the PRACH is transmitted in the PRACH resource included in the second PRACH resource type and the downlink signal specified for the random access is changed. The first counter value may not be incremented in the case that the PRACH is transmitted in the PRACH resource included in the second PRACH resource type. The first counter value may not be incremented in a case that the PRACH is transmitted in the PRACH resource included in the first PRACH resource type and the downlink signal specified for the random access is changed.

In determining the transmission power value $P_{PRACH}$ of the PRACH, PL may be a measurement value of a path loss of the downlink signal specified for the random access. In other words, the downlink signal specified for the random access may be a downlink signal used for calculating the transmission power value $P_{PRACH}$ of the PRACH.

For example, the counter value incremented for each transmission of the PRACH may be configured for each PRACH resource type. For example, a third counter value may be configured for the first PRACH resource type and a fourth counter value may be configured for the second PRACH resource type. For example, the third counter value may be a counter value that is incremented in the case that the PRACH is transmitted in the PRACH resource included in the first PRACH resource type. The fourth counter value may be a counter value that is incremented in the case that the PRACH is transmitted in the PRACH resource included in the second PRACH resource type. In other words, the third counter value may not be incremented in the case that the PRACH is transmitted in the PRACH resource included in the first PRACH resource type. The fourth counter value may not be incremented in the case that the PRACH is transmitted in the PRACH resource included in the second PRACH resource type.

For example, the information related to the transmission power of the PRACH may be a counter value corresponding to the second PRACH resource type.

For example, a power headroom $P_{PH}$ for the PRACH may be calculated using $P_{PH}=P_{CMAX}-P_{PRACH}$.

For example, the PRACH resource type used for the transmission of the PRACH may be the first PRACH resource type in a case that the reference signal received power of the downlink signal specified for the random access is larger than a first threshold. The PRACH resource type used for the transmission of the PRACH may be the second PRACH resource type in a case that the reference signal received power of the downlink signal specified for the random access is smaller than the first threshold. The PRACH resource type used for the transmission of the PRACH may be the first PRACH resource type or the second PRACH resource type in a case that the reference signal received power of the downlink signal specified for the random access is equal to the first threshold.

For example, the PRACH resource type used for the transmission of the PRACH may be the first PRACH resource type in a case that the reference signal received power of the downlink signal specified for the random access is larger than a first threshold. The PRACH resource type used for the transmission of the PRACH may be the second PRACH resource type in a case that the reference signal received power of the downlink signal specified for the random access is smaller than the first threshold. The PRACH resource type used for the transmission of the PRACH may be the first PRACH resource type or the second PRACH resource type in a case that the reference signal received power of the downlink signal specified for the random access is equal to the first threshold.

For example, the PRACH resource type used for the transmission of the PRACH may be the first PRACH resource type in a case that the transmission power value of the PRACH is smaller than a second threshold. The PRACH resource type used for the transmission of the PRACH may be the second PRACH resource type in a case that the transmission power value of the PRACH is larger than the second threshold. The PRACH resource type used for the transmission of the PRACH may be the first PRACH resource type or the second PRACH resource type in a case that the transmission power value of the PRACH is equal to the second threshold.

For example, the PRACH resource type used for the transmission of the PRACH may be the first PRACH resource type in a case that the counter value incremented for each transmission of the PRACH in the random access is smaller than a third threshold. The PRACH resource type used for the transmission of the PRACH may be the second PRACH resource type in a case that the counter value incremented for each transmission of the PRACH in the random access is larger than the third threshold. The PRACH resource type used for the transmission of the PRACH may be the first PRACH resource type or the second PRACH resource type in a case that the counter value incremented for each transmission of the PRACH in the random access is equal to the third threshold.

For example, the PRACH resource type used for the transmission of the PRACH may be the first PRACH resource type in a case that the counter value used for configuring the power of the PRACH is smaller than a fourth threshold. The PRACH resource type used for the transmission of the PRACH may be the second PRACH resource type in a case that the counter value used for configuring the power of the PRACH is larger than the fourth threshold. The PRACH resource type used for the transmission of the PRACH may be the first PRACH resource type or the second PRACH resource type in a case that the counter value used for configuring the power of the PRACH is equal to the fourth threshold.

For example, the PRACH resource type used for the transmission of the PRACH may be the first PRACH resource type in a case that the power headroom for the PRACH is larger than a fifth threshold. The PRACH resource type used for the transmission of the PRACH may be the second PRACH resource type in a case that the power headroom for the PRACH is smaller than the fifth threshold. The PRACH resource type used for the transmission of the PRACH may be the first PRACH resource type or the second PRACH resource type in a case that the power headroom for the PRACH is equal to the fifth threshold.

For example, in the contention-based random access, some or all of the first threshold, the second threshold, the third threshold, the fourth threshold, and the fifth threshold may be provided by the radio resource control layer processing circuitry 16. For example, in a case that the first threshold is provided by the radio resource control layer processing circuitry 16 in the contention-based random access, the PRACH resource type may be determined based on the first threshold. In a case that the first threshold is not provided by the radio resource control layer processing circuitry 16, the terminal apparatus 1 may determine the PRACH resource type not based on the first threshold. For example, in the case that the first threshold is not provided by the radio resource control layer processing circuitry 16, the terminal apparatus 1 may determine one of the first PRACH resource type and the second PRACH resource type according to a criterion of the terminal apparatus 1 based on the reception quality information of the downlink signal specified for the random access. The terminal apparatus 1 may select the second PRACH resource type, based on the first threshold not being provided by the radio resource control layer processing circuitry 16.

For example, in a case that the second threshold is provided by the radio resource control layer processing circuitry 16 in the contention-based random access, the PRACH resource type may be determined based on the second threshold. In a case that the second threshold is not provided by the radio resource control layer processing circuitry 16, the terminal apparatus 1 may determine the PRACH resource type not based on the second threshold. For example, in the case that the second threshold is not provided by the radio resource control layer processing circuitry 16, the terminal apparatus 1 may determine one of the first PRACH resource type and the second PRACH resource type according to the criterion of the terminal apparatus 1, based on the transmission power value of the PRACH. The terminal apparatus 1 may select the second PRACH resource type based on the second threshold not being provided by the radio resource control layer processing circuitry 16.

For example, in a case that the third threshold is provided by the radio resource control layer processing circuitry 16 in the contention-based random access, the PRACH resource type may be determined based on the third threshold. In a case that the third threshold is not provided by the radio resource control layer processing circuitry 16, the terminal apparatus 1 may determine the PRACH resource type not based on the third threshold. For example, in the case that the third threshold is not provided by the radio resource control layer processing circuitry 16, the terminal apparatus 1 may determine one of the first PRACH resource type and the second PRACH resource type according to the criterion of the terminal apparatus 1, based on the counter value incremented for each transmission of the PRACH in the random access. The terminal apparatus 1 may select the second PRACH resource type, based on the third threshold not being provided by the radio resource control layer processing circuitry 16.

For example, in a case that the fourth threshold is provided by the radio resource control layer processing circuitry 16 in the contention-based random access, the PRACH resource type may be determined based on the fourth threshold. In a case that the fourth threshold is not provided by the radio resource control layer processing circuitry 16, the terminal apparatus 1 may determine the PRACH resource type not based on the fourth threshold. For example, in the case that the fourth threshold is not provided by the radio resource control layer processing circuitry 16, the terminal apparatus 1 may determine one of the first PRACH resource type and the second PRACH resource type according to the criterion of the terminal apparatus 1, based on the counter value used for configuring the power of the PRACH. The terminal apparatus 1 may select the second PRACH resource type, based on the fourth threshold not being provided by the radio resource control layer processing circuitry 16.

For example, in a case that the fifth threshold is provided by the radio resource control layer processing circuitry 16 in the contention-based random access, the PRACH resource type may be determined based on the fifth threshold. In a case that the fifth threshold is not provided by the radio resource control layer processing circuitry 16, the terminal apparatus 1 may determine the PRACH resource type not based on the fifth threshold. For example, in the case that the fifth threshold is not provided by the radio resource control layer processing circuitry 16, the terminal apparatus 1 may determine one of the first PRACH resource type and the second PRACH resource type according to the criterion of the terminal apparatus 1, based on the power headroom for the PRACH. The terminal apparatus 1 may select the second PRACH resource type based on the fifth threshold not being provided by the radio resource control layer processing circuitry 16.

The terminal apparatus 1 may monitor the PDCCH including the DCI format with the CRC sequence scrambled with the RA-RNTI during a prescribed period after transmitting the PRACH. In a case that the PDCCH including the DCI format with the CRC sequence scrambled with the RA-RNTI is detected within the prescribed period, the reception of the PDSCH scheduled by the DCI format may be performed. In a case that the decoding of the transport block included in the PDSCH is successfully completed, information of the MAC layer included in the transport block is signaled to the medium access control layer processing circuitry 15. Here, in a case that the random access preamble index included in the information of the MAC layer is equal to the index of the random access preamble included in the PRACH transmitted by the terminal apparatus 1, the medium access control layer processing circuitry 15 acquires the uplink grant corresponding to the random access preamble index in the information of the MAC layer. Here, the uplink grant is a random access response grant.

The terminal apparatus 1 may interpret a bit sequence included in the random access response grant using the first rule or the second rule. For example, in the case that the first PRACH resource type is selected in the transmission of the PRACH, the first rule may be used for interpreting the bit sequence included in the random access response grant. In the case that the second PRACH resource type is selected in the transmission of the PRACH, the second rule may be used for interpreting the bit sequence included in the random access response grant.

FIG. 9 is a diagram illustrating an example of the first rule used for interpreting the bit sequence included in the random access response grant according to an aspect of the present embodiment. In a table illustrated in FIG. 9, a left column illustrates names of fields configured in the random access response grant, and a right column illustrates the numbers of bits of the corresponding fields. In the first rule, the bit sequence included in the random access response grant includes a Frequency hopping flag field, a PUSCH frequency resource allocation field, a PUSCH time resource allocation field, an MCS field, a TPC command for PUSCH field, a CSI request field, and a channel access-CP extension (ChannelAccess-CPext) field.

The frequency hopping flag field has one bit. The frequency hopping flag field may indicate whether the frequency hopping is applied to the PUSCH scheduled by using the random access response grant.

The PUSCH frequency allocation field has 14 bits or 12 bits. In a case that an operation with shared spectrum channel access is applied to the uplink carrier used for the transmission of the PUSCH, the PUSCH frequency allocation field may have 12 bits. In a case that the operation with shared spectrum channel access is not applied to the uplink carrier used for the transmission of the PUSCH, the PUSCH frequency allocation field may have 14 bits. The PUSCH frequency allocation field may be used for indicating resource block allocation for the PUSCH.

The PUSCH time resource allocation field has four bits. A value of the PUSCH time resource allocation field may be used for identifying a column of a first TDRA table. Here, the first TDRA table may be a table described in the specification in advance. The first TDRA table may be included in the system information. For example, the first TDRA table may be provided through a first RRC signalling.

The MCS field may be used for indicating an MCS of the PUSCH.

The TPC command field for PUSCH may be used for configuring a transmission power value of the PUSCH.

FIG. 10 is a diagram illustrating a configuration example of the transmission power value in the TPC command field for PUSCH according to an aspect of the present embodiment. The left column of the table illustrated in FIG. 10 illustrates the values in the TPC command field for PUSCH and the right column illustrates an example of interpretation of the corresponding values. For example, in a case that the value of the TPC command field for PUSCH is 2, an offset value of the transmission power value is −2 dB, and in a case that the value is 5, the offset value is 4 dB.

The CSI request field is a reserved field.

The channel access-CP extension field has two bits in a case that the operation with shared spectrum channel access is applied to the uplink carrier used for the transmission of the PUSCH. The channel access-CP extension field is zero bits in a case that the operation with shared spectrum channel access is not applied to the uplink carrier used for the transmission of the PUSCH.

The second rule used for interpreting the random access response grant may be a rule by which a configuration of the number of repetitions applied to the PUSCH may be determined based on the field of the random access response grant. For example, the second rule may be a rule by which the interpretations of some or all of the various fields used in the first rule may be configured to interpretations different from those in the first rule. The second rule may be a rule by which some or all of various fields used in the first rule may be assigned for fields used for indicating the configuration of the number of repetitions of the PUSCH.

For example, the second rule may be a rule by which the frequency hopping flag field used in the first rule may be used for indicating the configuration of the number of repetitions of the PUSCH. The second rule may be a rule by which the frequency hopping flag field used in the first rule may be assigned for the field used for indicating the configuration of the number of repetitions of the PUSCH.

For example, the second rule may be a rule by which a part of the PUSCH frequency resource allocation field used in the first rule may be used for indicating the configuration of the number of repetitions of the PUSCH. For example, in the second rule, in a case that the operation with shared spectrum channel access is applied to the uplink carrier used for the transmission of the PUSCH, 12−X bits may be used for the resource block allocation for the PUSCH. Here, X bits may be used for indicating the configuration of the number of repetitions of the PUSCH. In the second rule, in a case that the operation with shared spectrum channel access is not applied to the uplink carrier used for the transmission of the PUSCH, 14−X bits may be used for the resource block allocation for the PUSCH.

For example, the second rule may be a rule by which a part of the number of bits of the PUSCH frequency resource allocation field used in the first rule may be assigned for the field used for indicating the configuration of the number of repetitions of the PUSCH. For example, in the second rule, in the case that the operation with shared spectrum channel access is applied to the uplink carrier used for the transmission of the PUSCH, the PUSCH resource allocation field may have 12−Y bits. Here, Y bit may be assigned for the field used for indicating the configuration of the number of repetitions of the PUSCH. In the second rule, in the case that the operation with shared spectrum channel access is not applied to the uplink carrier used for the transmission of the PUSCH, the PUSCH resource allocation field may have 14−Y bits.

For example, the second rule may be a rule by which the PUSCH time resource allocation field used in the first rule may be associated with a second TDRA table different from the first TDRA table. For example, in the second rule, the PUSCH time resource allocation field may be used for identifying a column of the second TDRA table. Here, the second TDRA table may be included in the system information. For example, the second TDRA table may be provided through a second RRC signalling. The second RRC signalling may be the same as or different from the first RRC signalling.

For example, the second rule may be a rule by which the MCS field used in the first rule may be used for indicating the configuration of the number of repetitions of the PUSCH. The second rule may be a rule by which the MCS field used in the first rule may be assigned for the field used for indicating the configuration of the number of repetitions of the PUSCH.

For example, the second rule may be a rule by which the TPC command field for PUSCH used in the first rule may be used for indicating the configuration of the number of repetitions of the PUSCH. The second rule may be a rule by which the TPC command field for PUSCH used in the first rule may be assigned for the field used for indicating the configuration of the number of repetitions of the PUSCH.

FIG. 11 is a diagram illustrating a configuration example of the transmission power value in the TPC command field for PUSCH in the second rule according to an aspect of the present embodiment. In FIG. 11, the number of bits used for indicating a TPC command in the TPC command field for PUSCH is 2. For example, in a case that the value of the TPC command is 0, the offset value of the transmission power value is −2 dB; in a case that the value of the TPC command is 1, the offset value of the transmission power value is 2 dB; in a case that the value of the TPC command is 2, the offset value of the transmission power value is 6 dB; and in a case that the value of the TPC command is 3, the offset value of the transmission power value is 8 dB.

In this way, a second TPC table used for determining the offset value of the transmission power value in the second rule may be different from the first TPC table used for determining the offset value of the transmission power value in the first rule. In the second TPC table, an offset value of a positive transmission power value may be configured to be larger than an offset value of a negative transmission power value.

The terminal apparatus 1 may interpret the bit sequence included in the random access response grant using the first rule or the third rule. For example, in the case that the first PRACH resource type is selected in the transmission of the PRACH, the first rule may be used for interpreting the bit sequence included in the random access response grant. In the case that the second PRACH resource type is selected in the transmission of the PRACH, the third rule may be used for interpreting the bit sequence included in the random access response grant.

In the third rule, a part of the bit sequence included in the random access response grant may be used for switching the rules. For example, in a case that a part of the bit sequence included in the random access response grant indicates a prescribed value, the terminal apparatus 1 may interpret various fields of the bit sequence included in the random access response grant using the second rule. In a case that a part of the bit sequence included in the random access response grant does not indicate the prescribed value, the terminal apparatus 1 may interpret various fields of the bit sequence included in the random access response grant using the first rule.

For example, in the third rule, a bit, in the bit sequence included in the random access response grant, corresponding to the CSI request field may be used for switching the rules. For example, in a case that the bit corresponding to the CSI request field indicates a prescribed value, the terminal apparatus 1 may interpret various fields other than the CSI request field of the bit sequence included in the random access response grant by using the second rule. In a case that the bit corresponding to the CSI request field does not indicate the prescribed value, the terminal apparatus 1 may interpret various fields other than the CSI request field of the bit sequence included in the random access response grant by using the first rule.

In the retransmission of the message 3 PUSCH, in the case that the second PRACH resource type is selected in the transmission of the PRACH, the field indicating the configuration of the number of repetitions of the PUSCH may be included in the DCI format used for indicating the retransmission of the message 3 PUSCH. In the retransmission of the message 3 PUSCH, in the case that the first PRACH resource type is selected in the transmission of the PRACH, the field indicating the configuration of the number of repetitions of the PUSCH may not be included in the DCI format used for indicating the retransmission of the message 3 PUSCH.

Even in a case that the first PRACH resource type and the second PRACH resource type are provided for the uplink BWP used for the random access by the radio resource control layer processing circuitry 16, the terminal apparatus 1 may select the first PRACH resource type in a non-contention-based random access. Even in a case that the first PRACH resource type and the second PRACH resource type are provided for the uplink BWP used for the random access by the radio resource control layer processing circuitry 16, the terminal apparatus 1 may select the second PRACH resource type in the non-contention-based random access. In other words, even in a case that the first PRACH resource type and the second PRACH resource type are provided for the uplink BWP used for the random access by the radio resource control layer processing circuitry 16, the non-contention-based random access may be associated with one PRACH resource type.

Even in a case that the first PRACH resource type and the second PRACH resource type are provided for the uplink BWP used for the random access by the radio resource control layer processing circuitry 16, the terminal apparatus 1 may not recognize the first PRACH resource type or the second PRACH resource type in the non-contention-based random access. In a case that the terminal apparatus 1 does not recognize the PRACH resource type, the first rule may be used for interpreting the random access response grant. In the case that the terminal apparatus 1 does not recognize the PRACH resource type, the second rule may be used for interpreting the random access response grant. In the case that the terminal apparatus 1 does not recognize the PRACH resource type, the third rule may be used for interpreting the random access response grant. The terminal apparatus 1 may report whether or not being able to recognize the PRACH resource type to the base station apparatus 3 in a capability information reporting procedure (Capability reporting procedure).

Even in a case that the first PRACH resource type and the second PRACH resource type are provided for the uplink BWP used for the random access by the radio resource control layer processing circuitry 16, the terminal apparatus 1 may use the first rule for interpreting the random access response grant regardless of whether either PRACH resource type is selected in the non-contention-based random access. Even in a case that the first PRACH resource type and the second PRACH resource type are provided for the uplink BWP used for the random access by the radio resource control layer processing circuitry 16, the terminal apparatus 1 may use the second rule for interpreting the random access response grant regardless of whether either PRACH resource type is selected in the non-contention-based random access. Even in a case that the first PRACH resource type and the second PRACH resource type are provided for the uplink BWP used for the random access by the radio resource control layer processing circuitry 16, the terminal apparatus 1 may use the third rule for interpreting the random access response grant regardless of whether either PRACH resource type is selected in the non-contention-based random access. The terminal apparatus 1 may report whether or not being able to interpret the random access response grant using the second rule to the base station apparatus 3 in the capability information reporting procedure (Capability reporting procedure). The terminal apparatus 1 may report whether or not being able to interpret the random access response grant using the third rule to the base station apparatus 3 in the capability information reporting procedure (Capability reporting procedure).

In a case that the first PRACH resource type is provided for the uplink BWP used for the random access by the radio resource control layer processing circuitry 16, and the second PRACH resource type is not provided for the uplink BWP by the radio resource control layer processing circuitry 16, the terminal apparatus 1 may select the first PRACH resource type in the contention-based random access. Here, the random access response grant acquired during the random access may be interpreted using the first rule.

In the case that the first PRACH resource type is provided for the uplink BWP used for the random access by the radio resource control layer processing circuitry 16, and the second PRACH resource type is not provided for the uplink BWP by the radio resource control layer processing circuitry 16, the terminal apparatus 1 may select the first PRACH resource type in the non-contention-based random access. Here, the terminal apparatus 1 may determine a rule used for interpreting the random access response grant based on the function included in the terminal apparatus 1. For example, in a case that the terminal apparatus 1 has a function of using the second rule for interpreting the random access response grant, the random access response grant acquired during the non-contention-based random access may be interpreted using the second rule even in a case that the first PRACH resource type is selected. In a case that the terminal apparatus 1 has a function of using the third rule for interpreting the random access response grant, the random access response grant acquired during the non-contention-based random access may be interpreted using the third rule even in a case that the first PRACH resource type is selected. In a case that the terminal apparatus 1 does not have the function of using the second rule for interpreting the random access response grant and the terminal apparatus 1 does not have the function of using the third rule for interpreting the random access response grant, the random access response grant acquired during the non-contention-based random access may be interpreted using the first rule.

In a case that the second PRACH resource type is provided for the uplink BWP used for the random access by the radio resource control layer processing circuitry 16, and the first PRACH resource type is not provided for to the uplink BWP by the radio resource control layer processing circuitry 16, the terminal apparatus 1 may select the second PRACH resource type in the contention-based random access. Here, the random access response grant acquired during the random access may be determined by using the second rule or the third rule.

In the case that the second PRACH resource type is provided for the uplink BWP used for the random access by the radio resource control layer processing circuitry 16, and the first PRACH resource type is not provided for the uplink BWP by the radio resource control layer processing circuitry 16, the terminal apparatus 1 may select the second PRACH resource type in the non-contention-based random access. Here, the terminal apparatus 1 may determine a rule used for interpreting the random access response grant based on the function included in the terminal apparatus 1. For example, in the case that the terminal apparatus 1 has the function of using the second rule for interpreting the random access response grant, the random access response grant acquired during the non-contention-based random access may be interpreted using the second rule. In the case that the terminal apparatus 1 has the function of using the third rule for interpreting the random access response grant, the random access response grant acquired during the non-contention-based random access may be interpreted using the third rule.

In a case that the random access is triggered by the base station apparatus 3, the terminal apparatus 1 may determine the PRACH resource type based on information signaled from the base station apparatus 3 even in a case that the first PRACH resource type and the second PRACH resource type are provided for the uplink BWP used for the random access by the radio resource control layer processing circuitry 16.

The random access triggered by the base station apparatus 3 may be a random access triggered by a PDCCH order. The random access triggered by the base station apparatus 3 may be a random access triggered by RRC signalling. For example, in the PDCCH order, the DCI format used for the PDCCH order may include information indicating the PRACH resource type to be used by the terminal apparatus 1 during the random access. The RRC signalling may include information indicating the PRACH resource type to be used by the terminal apparatus 1 during the random access.

In the case that the random access is triggered by the base station apparatus 3, the terminal apparatus 1 may determine a rule used for interpreting the random access response grant based on the information signaled from the base station apparatus 3 even in a case that the first PRACH resource type and the second PRACH resource type are provided for the uplink BWP used for the random access by the radio resource control layer processing circuitry 16.

For example, in the PDCCH order, the DCI format used for the PDCCH order may include information indicating a rule to be used by the terminal apparatus 1 during the random access. The RRC signalling may include information indicating a rule to be used by the terminal apparatus 1 during the random access.

Various aspects of apparatuses according to an aspect of the present embodiment will be described below.

(1) In order to accomplish the object described above, an aspect of the present invention is contrived to provide the following means. Specifically, a first aspect of the present invention is a terminal apparatus including an RRC layer processing circuitry configured to manage a first PRACH resource type in a certain BWP, a second PRACH resource type in the certain BWP, and a threshold, a MAC layer processing circuitry configured to select one PRACH resource type from the first PRACH resource type and the second PRACH resource type, a transmitter configured to transmit the PRACH in the one PRACH resource type, and a receiver configured to receive a PDCCH with an RA-RNTI calculated based on the one resource and receive a PDSCH scheduled by a DCI format included in the PDCCH, wherein the first PRACH resource type is selected in a case that a value related to a received power of a downlink signal is lower than the threshold, the second PRACH resource type is selected in a case that the value related to the received power is larger than or equal to the threshold, an uplink grant included in the PDSCH is interpreted using a first rule in a case that the PRACH is transmitted in the first PRACH resource type, the uplink grant included in the PDSCH is interpreted using a second rule in a case that the PRACH is transmitted in the second PRACH resource type, and the uplink grant included in the PDSCH is interpreted using the second rule in a case that the threshold is not configured in the RRC layer processing circuitry.

(2) In the first aspect of the present invention, the uplink grant included in the PDSCH is interpreted using the second rule in a case that the first PRACH resource type is not configured for the certain BWP.

(3) In the first aspect of the present invention, in a non-contention-based random access, 1) the uplink grant included in the PDSCH is interpreted using the second rule, 2) whether the uplink grant is interpreted using the first rule or the second rule is determined according to the PDCCH order, or 3) the RRC layer processing circuitry holds a parameter for determining whether the uplink grant is interpreted using the first rule or the second rule.

(4) A second aspect of the present invention is a base station apparatus including an RRC layer processing circuitry configured to manage a first PRACH resource type in a certain BWP, a second PRACH resource type in the certain BWP, and a threshold, a receiver configured to receive the PRACH in one PRACH resource type selected by a terminal apparatus, and a transmitter configured to transmit a PDCCH with an RA-RNTI calculated based on the one PRACH resource type and transmit a PDSCH scheduled by a DCI format included in the PDCCH, wherein an uplink grant included in the PDSCH is interpreted using a first rule in a case that the PRACH is transmitted in the first PRACH resource type, the uplink grant included in the PDSCH is interpreted using a second rule in a case that the PRACH is transmitted in the second PRACH resource type, the uplink grant included in the PDSCH is interpreted using the second rule in a case that the threshold is not configured in the RRC layer processing circuitry, and whether the uplink grant is interpreted using the first rule or the second rule is indicated to the terminal apparatus in a non-contention-based random access.

A program running on the base station apparatus 3 and the terminal apparatus 1 according to an aspect of the present invention may be a program (a program that causes a computer to function) that controls a Central Processing Unit (CPU) and the like so as to implement the functions of the above-described embodiment according to an aspect of the present invention. The information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially implemented by a computer. In that case, this configuration may be implemented by recording a program for implementing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as peripheral devices. A "computer-readable recording medium" refers to a portable medium such as a flexible disk, a magneto-optical disk, a ROM, and a CD-ROM, and a storage apparatus such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

Furthermore, the base station apparatus 3 according to the aforementioned embodiment may be implemented as an aggregation (apparatus group) including multiple apparatuses. Each of the apparatuses included in such an apparatus group may include a part or all of each function or each functional block of the base station apparatus 3 according to the aforementioned embodiment. As the apparatus group, it is only necessary to have all of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have a part or all of the functions of a higher node for an eNodeB and/or a gNB.

Also, a part or all portions of each of the terminal apparatus 1 and the base station apparatus 3 according to the aforementioned embodiment may be implemented as an LSI, which is typically an integrated circuit, or may be implemented as a chip set. The functional blocks of each of the terminal apparatus 1 and the base station apparatus 3 may be individually implemented as a chip, or a part or all of the functional blocks may be integrated into a chip. Furthermore, a circuit integration technique is not limited to the LSI and may be implemented with a dedicated circuit or a general-purpose processor. Moreover, in a case that a circuit integration technology that substitutes an LSI appears with the advance of the semiconductor technology, it is also possible to use an integrated circuit based on the technology.

In addition, although the aforementioned embodiments have described the terminal apparatus as an example of a communication apparatus, the present invention is not limited to such a terminal apparatus, and is also applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. A configuration in which elements described in the respective embodiments and having mutually the similar effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus

10, 30 Radio transmission and/or reception circuitry
10*a*, 30*a* Radio transmission circuitry
10*b*, 30*b* Radio reception circuitry
11, 31 Antenna circuitry
12, 32 RF circuitry
13, 33 Baseband circuitry
14, 34 Higher layer processing circuitry
15, 35 Medium access control layer processing circuitry
16, 36 Radio resource control layer processing circuitry
91, 92, 93, 94 Search space set
300 Component carrier
301 Primary cell
302, 303 Secondary cell
3000 Point
3001, 3002 Resource grid
3003, 3004 BWP
3011, 3012, 3013, 3014 Offset
3100, 3200 Common resource block set

The invention claimed is:

1. A terminal apparatus comprising:
a medium access control (MAC) layer processing circuitry configured to:
select one of a first Physical Random Access CHannel (PRACH) resource type and a second PRACH resource type, wherein the second PRACH resource type is selected in a case that the first PRACH resource type is not provided for an uplink Bandwidth Part (BWP) used for a random access procedure; and
a physical layer processing circuitry configured to;
use a first rule to derive information from a value of a Modulation and Coding Scheme (MCS) field included in a random access response grant of the random access procedure in a case that the first PRACH resource type is selected, or use a second rule to derive the information in a case that the second PRACH resource type is selected, the second rule being different from the first rule, and
based on the second rule, determine that the value of the MCS field indicates a number of repetitions of a Physical Uplink Shared CHannel (PUSCH) scheduled by the random access response grant in a case that the second PRACH resource type is selected.

2. A communication method performed by a terminal apparatus, the communication method comprising:
selecting one of a first Physical Random Access CHannel (PRACH) resource type and a second PRACH resource type, wherein the second PRACH resource type is selected in a case that the first PRACH resource type is not provided for an uplink Bandwidth Part (BWP) used for a random access procedure;
using a first rule to derive information from a value of a Modulation and Coding Scheme (MCS) field included in a random access response grant of the random access procedure in a case that the first PRACH resource type is selected, or using a second rule to derive the information in a case that the second PRACH resource type is selected, the second rule being different from the first rule; and
based on the second rule, determining that the value of the MCS field indicates a number of repetitions of a Physical Uplink Shared CHannel (PUSCH) scheduled by the random access response grant in a case that the second PRACH resource type is selected.

* * * * *